US006994077B2

(12) United States Patent
Kobayashi et al.

(10) Patent No.: US 6,994,077 B2
(45) Date of Patent: Feb. 7, 2006

(54) CONTROL SYSTEM FOR INTERNAL COMBUSTION ENGINE

(75) Inventors: Nobuki Kobayashi, Toyota (JP); Shizuo Sasaki, San Antonio, TX (US); Taro Aoyama, Susono (JP); Kouji Yoshizaki, Numazu (JP); Hiroki Murata, Gotenba (JP); Yoshiki Hashimoto, Suntou-gun (JP); Kazuhisa Inagaki, Aichi-gun (JP); Kiyomi Nakakita, Aichi-gun (JP); Shoji Nakahara, Aichi-gun (JP); Yoshihiro Hotta, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/527,232

(22) PCT Filed: Sep. 8, 2003

(86) PCT No.: PCT/JP03/11452

§ 371 (c)(1),
(2), (4) Date: Jun. 15, 2005

(87) PCT Pub. No.: WO2004/022959

PCT Pub. Date: Mar. 18, 2004

(65) Prior Publication Data

US 2005/0229903 A1 Oct. 20, 2005

(30) Foreign Application Priority Data

| | | | |
|---|---|---|---|
| Sep. 9, 2002 | (JP) | ............................. | 2002-263173 |
| Sep. 9, 2002 | (JP) | ............................. | 2002-263182 |
| Dec. 26, 2002 | (JP) | ............................. | 2002-378018 |

(51) Int. Cl.
*F02B 47/08* (2006.01)

(52) U.S. Cl. ............................. 123/568.11; 123/568.16

(58) Field of Classification Search ........... 123/568.11, 123/568.21, 568.31, 568.14, 568.16
See application file for complete search history.

(56) References Cited

FOREIGN PATENT DOCUMENTS

| | | |
|---|---|---|
| JP | A 61-277846 | 12/1986 |
| JP | A 03-233162 | 10/1991 |
| JP | A 07-139416 | 5/1995 |
| JP | A 08-246935 | 9/1996 |
| JP | A 10-238395 | 9/1998 |
| JP | A 11-141386 | 5/1999 |
| JP | A 11-148410 | 6/1999 |
| JP | A 11-173201 | 6/1999 |
| JP | A 2000-54889 | 2/2000 |
| JP | A 2000-234558 | 8/2000 |
| JP | A 2000-240497 | 9/2000 |
| JP | A 2001-123871 | 5/2001 |

*Primary Examiner*—Bibhu Mohanty
(74) *Attorney, Agent, or Firm*—Oliff & Berridge PLC

(57) ABSTRACT

Cylinders of a diesel engine 1 are provided with cylinder pressure sensors 29*a* to 29*d* for detecting combustion chamber pressures. An electronic control unit (ECU) 20 of the engine selects optimum combustion parameters in accordance with a fuel injection mode of fuel injectors 10*a* to 10*d* of the engine and a combustion mode determined by the amount of EGR gas supplied from the EGR valve 35 from among a plurality of types of combustion parameters expressing the combustion state of the engine calculated based on the cylinder pressure sensor output and feedback controls the fuel injection amount and fuel injection timing so that the values of the combustion parameters match target values determined in accordance with the engine operating conditions. Due to this, the engine combustion state is controlled to the optimum state at all times regardless of the fuel injection mode or combustion mode.

32 Claims, 25 Drawing Sheets

Fig.3

| INJECTION MODE \ COMBUSTION PARAMETER | $(dP/d\theta)max$ | $(dP/d\theta)NO.2max$ | $(dP/d\theta)NO.3max$ |
|---|---|---|---|
| ONLY MAIN FUEL INJECTION | MAIN FUEL INJECTION INJECTION TIMING | — | — |
| PILOT INJECTION + MAIN FUEL INJECTION | PILOT INJECTION INJECTION TIMING | MAIN FUEL INJECTION INJECTION TIMING | — |
| MAIN FUEL INJECTION + AFTER INJECTION | MAIN FUEL INJECTION INJECTION TIMING | AFTER INJECTION INJECTION TIMING | — |
| PILOT INJECTION + MAIN FUEL INJECTION + AFTER INJECTION | PILOT INJECTION INJECTION TIMING | MAIN FUEL INJECTION INJECTION TIMING | AFTER INJECTION INJECTION TIMING |

Fig. 5

| INJECTION MODE \ COMBUSTION PARAMETER | $(d2P/d\theta 2)max$ | $(d2P/d\theta 2)NO.2max$ | $(d2P/d\theta 2)NO.3max$ |
|---|---|---|---|
| ONLY MAIN FUEL INJECTION | MAIN FUEL INJECTION INJECTION TIMING | — | — |
| PILOT INJECTION + MAIN FUEL INJECTION | PILOT INJECTION INJECTION TIMING | MAIN FUEL INJECTION INJECTION TIMING | — |
| MAIN FUEL INJECTION + AFTER INJECTION | MAIN FUEL INJECTION INJECTION TIMING | AFTER INJECTION INJECTION TIMING | — |
| PILOT INJECTION + MAIN FUEL INJECTION + AFTER INJECTION | PILOT INJECTION INJECTION TIMING | MAIN FUEL INJECTION INJECTION TIMING | AFTER INJECTION INJECTION TIMING |

Fig.6

| COMBUSTION PARAMETER / INJECTION MODE | $(dQ/d\theta)max$ | $(dQ/d\theta)NO.2max$ | $(dQ/d\theta)NO.3max$ |
|---|---|---|---|
| ONLY MAIN FUEL INJECTION | MAIN FUEL INJECTION INJECTION TIMING | — | — |
| PILOT INJECTION + MAIN FUEL INJECTION | PILOT INJECTION INJECTION TIMING | MAIN FUEL INJECTION INJECTION TIMING | — |
| MAIN FUEL INJECTION + AFTER INJECTION | MAIN FUEL INJECTION INJECTION TIMING | AFTER INJECTION INJECTION TIMING | — |
| PILOT INJECTION + MAIN FUEL INJECTION + AFTER INJECTION | PILOT INJECTION INJECTION TIMING | MAIN·FUEL INJECTION INJECTION TIMING | AFTER INJECTION INJECTION TIMING |

CONTROL SYSTEM FOR INTERNAL COMBUSTION ENGINE

TECHNICAL FIELD

The present invention relates to a control system for an internal combustion engine, more particularly relates to a control system for optimizing combustion in a diesel engine.

BACKGROUND ART

Due to the recent toughening of exhaust gas controls and demands for reducing noise, there has been a rising demand for optimizing combustion in the combustion chambers of diesel engines as well. To optimize combustion, accurate control of the fuel injection amount, fuel injection timing, injection period, etc. becomes necessary even in diesel engines.

However, in a diesel engine, generally the amount of intake air is not adjusted. The engine load is controlled by the fuel injection amount. Therefore, in a diesel engine, combustion is performed in a lean air-fuel ratio region considerably higher than the stoichiometric air-fuel ratio. Further, the air-fuel ratio changes depending on the load. Therefore, in a conventional diesel engine, the air-fuel ratio is not strictly controlled as in a gasoline engine. In the past, the fuel injection amount, fuel injection timing, and other fuel injection parameters also have not been controlled as strictly as with a gasoline engine. Further, in the past, in a diesel engine, the target values of the fuel injection amount, injection timing, injection pressure, and other fuel injection parameters have been determined from the engine operating conditions (speed, accelerator opening degree, etc.) and the fuel injector has been open-loop controlled in accordance with those target values. With open loop control, however, it was impossible to prevent error in the actual fuel injection amount compared with the target fuel injection amount and was difficult to accurately control the combustion state to the targeted state.

Further, to improve the exhaust gas properties and reduce the noise, multi-fuel injection injecting fuel a plurality of times before and after the main fuel injection so as to optimally adjust the combustion state is effective. However, for multi-fuel injection, it is necessary to precisely control the fuel injection amounts and injection timings of the plurality of fuel injections.

Further, in a common rail type high pressure fuel injection system designed to be employed in recent diesel engines for improving the combustion state, since the fuel injection period is short and the fuel injection pressure changes during the injection, there is the problem of a susceptibility to error in the fuel injection amount. Therefore, in a common rail type high pressure fuel injection system, measures have been adopted such as setting the tolerance of the fuel injectors small so as to improve the fuel injection accuracy, but in practice fuel injectors change in fuel injection characteristics along with the period of use due to wear of the parts etc., so with open loop control, it is difficult to make the fuel injection parameters constantly accurately match with the target values.

In this way, in a diesel engine, error is liable to occur in the fuel injection amount etc., so even if setting target values giving the optimal combustion state, in practice sometimes making the fuel injection amount match with the target value is difficult.

On the other hand, it is known in the art to reduce the combustion temperature of an engine so as to reduce the $NO_x$ and other harmful emissions by recirculating part of the engine exhaust gas to the engine combustion chambers as EGR gas. Further, even in a diesel engine engaged in normal lean air-fuel ratio operation, it is possible to supply a relatively large amounts of EGR gas to the combustion chamber so as to reduce the harmful emissions in the exhaust gas.

However, EGR gas has a large effect on combustion. In particular, in a diesel engine, the amount of EGR gas has a large effect on the ignition delay time from the start of fuel injection to when the injected fuel starts to burn. Therefore, if EGR gas is excessively supplied to the combustion chamber, the engine combustion state will deteriorate and a drop in the engine performance and deterioration of the exhaust gas properties will occur.

On the other hand, if the amount of EGR gas is small, the effect of suppression of the harmful emissions will fall. Therefore, the amount of EGR gas has to be controlled to a suitable amount in accordance with the operating conditions of the engine.

However, conventionally the amount of EGR gas has not been controlled precisely. In particular, in a diesel engine, the opening degree of an EGR valve for controlling the flow rate of EGR gas usually was open loop controlled to a value determined from the engine speed and accelerator opening degree (amount of depression of accelerator pedal).

However, due to the recent toughening of exhaust gas controls and demands for reducing noise, a need has arisen to precisely control even the EGR gas flow rate to its optimal value. If precisely controlling the EGR in this way, a sufficient accuracy cannot be obtained with open loop control based on the engine speed and accelerator opening degree like in the past. Further, for example, it is possible to arrange an air-fuel ratio sensor in the engine exhaust passage and to control the amount of EGR gas based on the exhaust air-fuel ratio detected by the air-fuel ratio sensor, but with an engine like a diesel engine which is operated in a state where the exhaust air-fuel ratio is extremely lean, the detection accuracy of the air-fuel ratio sensor falls, so there is the problem that if controlling the amount of EGR gas based on the exhaust air-fuel ratio detected by the air-fuel ratio sensor, the error becomes large.

Even in control of the amount of EGR gas, it is effective to detect the actual combustion state by some form or another and feedback control the amount of EGR gas so that the actual combustion state matches with the targeted combustion state.

That is, while conventionally the fuel injection amount, fuel injection timing, amount of EGR gas, etc. have been open loop controlled based on the engine speed and accelerator opening degree, to improve the properties of the exhaust gas and reduce the noise, it becomes necessary to accurately feedback control the fuel injection amount, fuel injection timing, amount of EGR gas, etc. based on the actual combustion state.

Control of the fuel injection or EGR based on the actual engine combustion state is for example described in Japanese Unexamined Patent Publication (Kokai) No. 2000-54889.

The system of Japanese Unexamined Patent Publication (Kokai) No. 2000-54889 does not relate to a diesel engine, but relates to a gasoline engine, but uses the heat release (heat generation) rate in the combustion chamber as a combustion parameter expressing the combustion state of the engine and controls the flow rate of EGR gas and the fuel injection timing, fuel injection amount, ignition timing, etc. so that the heat release rate becomes a predetermined pattern.

That is, the system of Japanese Unexamined Patent Publication (Kokai) No. 2000-54889 arranges a cylinder pressure sensor for detecting the pressure inside an engine combustion chamber in each cylinder, calculates the heat release rate at each crank angle based on the detected actual pressure inside the combustion chamber (combustion pressure) and crank angle, and feedback controls the amount of EGR gas, ignition timing, fuel injection timing, etc. so that the pattern of change of the heat release rate with respect to the crank angle matches a predetermined ideal pattern of change in accordance with the operating conditions and thereby obtain the optimal combustion.

The system of Japanese Unexamined Patent Publication (Kokai) No. 2000-54889 takes note of the heat release rate as a parameter relating to combustion, calculates the pattern of the heat release rate in actual operating conditions, and makes the heat release rate follow a predetermined pattern by feedback controlling the ignition timing, fuel injection amount, etc. The system of Japanese Unexamined Patent Publication (Kokai) No. 2000-54889 relates to a gasoline engine, but it may be considered to similarly provide cylinder pressure sensors in a diesel engine as well and thereby calculate the pattern of the heat release rate based on the outputs of the cylinder pressure sensors and feedback control the fuel injection timing and fuel injection amount so that the peak positions or pattern of the heat release rate becomes predetermined peak positions or pattern of heat release rate.

However, the system of Japanese Unexamined Patent Publication (Kokai) No. 2000-54889 uses only the heat release rate in a combustion chamber as a parameter expressing the combustion state of the engine for feedback control of the combustion state. The system of Japanese Unexamined Patent Publication (Kokai) No. 2000-54889 is used by a gasoline engine. In a gasoline engine, the premixed air-fuel mixture is ignited by sparks. The ignition, combustion, and other combustion parameters also do not change much. Therefore, no great error occurs even if using only the peak positions or pattern of the heat release rate as a parameter expressing the combustion state.

In a diesel engine however, for example, sometimes not only main fuel injection, but also multi-fuel injection including pilot injection performed before the main fuel injection, after injection performed after the main fuel injection, etc. is performed. Even looking at just the type of injection (injection mode), sometimes there is a large difference. Further, in a diesel engine, the combustion pattern (combustion mode) changes depending on the amount of EGR gas.

For this reason, since the change in pressure in a combustion chamber greatly differs depending on the injection mode or combustion mode as well, feedback control of the combustion state by just the peak positions or pattern of the heat release rate is not necessarily suitable.

For example, in an in-cylinder fuel injector of a diesel engine, the injection amount, injection timing, and other fuel injection characteristics gradually change along with the period of use resulting in deviation in fuel injection characteristics, but such deviation in fuel injection characteristics is difficult to accurately correct based on the peak positions or pattern of the heat release rate.

Further, when performing pilot injection or main fuel injection or after injection or other multi-fuel injection, optimization of the combustion state requires optimal control of the fuel injection amount and injection timing of the fuel of each, but feedback control of the fuel injection characteristics of a plurality of fuel injections is difficult based on only the peak positions or pattern of the heat release rate.

On the other hand, as an example of a combustion control system of an internal combustion engine using a parameter other than the heat release rate to detect the combustion state and controlling the fuel injection characteristics of multi-fuel injection in accordance with the combustion state, there is the one described in Japanese Unexamined Patent Publication (Kokai) No. 2001-123871.

The system of Japanese Unexamined Patent Publication (Kokai) No. 2001-123871 measures the combustion noise of a diesel engine, judges whether the pilot injection amount is too great based on the measured combustion noise, and corrects the pilot injection amount based on this. Further, as the combustion noise, it uses the derivative or second derivative of the cylinder pressure detected by a cylinder pressure sensor detecting the pressure inside a combustion chamber so as to remove the effect of mechanical vibration and thereby improve the detection accuracy of the combustion noise.

That is, the system of Japanese Unexamined Patent Publication (Kokai) No. 2001-123871 feedback controls the pilot injection amount based on the actually measured combustion noise so as to keep the combustion noise below a target level at all times.

As explained above, since the system of Japanese unexamined Patent Publication (Kokai) No. 2001-123871 feedback controls the pilot injection amount based on the actually measured combustion noise, it can keep the combustion noise below a target level at all times. However, while the system of Japanese Unexamined Patent Publication (Kokai) No. 2001-123871 keeps the combustion noise below a target value, it does not necessarily always obtain a good combustion state. Conversely, sometimes it deteriorates the exhaust properties.

That is, to obtain good exhaust properties, it is necessary to suitably control not only the injection amount of the pilot injection, but also the injection timing, but the system of Japanese Unexamined Patent Publication (Kokai) No. 2001-123871 controls only the injection amount of the pilot injection based on the combustion noise and does not control the injection timing based on the actual combustion state. Therefore, the system of Japanese Unexamined Patent Publication (Kokai) No. 2001-123871 has the problem that while the combustion noise falls, the exhaust properties are not always improved.

Further, the system of Japanese Unexamined Patent Publication (Kokai) No. 2001-123871 deals only with pilot injection and even more so only operation with just one pilot injection, so has the problem that it cannot suitably control the injection amounts and injection timings of the different fuel injections in multi-fuel injection consisting of a plurality of pilot injections or after injection performed after main fuel injection.

DISCLOSURE OF THE INVENTION

The present invention, in view of the above problems, has as its object to provide a control system for an internal combustion engine using an optimal combustion parameter in accordance with an injection mode or combustion mode for feedback control of the fuel injection amount, injection timing, and amount of EGR gas even in a diesel engine so as to enable optimal control of the combustion state of the diesel engine.

To achieve the above object, according to the present invention, there is provided a control system for an internal combustion engine provided with a fuel injector for injecting fuel into an engine combustion chamber, an EGR system for recirculating part of the engine exhaust into the engine combustion chamber as EGR gas, and a cylinder pressure sensor for detecting a pressure inside the engine combustion chamber, the control system for an internal combustion engine provided with combustion parameter calculating means for calculating a combustion parameter expressing an engine combustion state including at least one of a cylinder heat release amount, a combustion start timing, and a combustion period based on a relationship predetermined using the combustion chamber pressure detected by the cylinder pressure sensor and an engine crank angle and correcting means for correcting at least one of a fuel injection amount, fuel injection timing, and amount of EGR gas so that the calculated combustion parameter becomes a target value predetermined in accordance with the engine operating conditions, a combustion parameter selected in accordance with a fuel injection mode or combustion mode of the engine among a plurality of types of combustion parameters expressing the engine combustion state calculated based on the combustion chamber pressure and engine crank angle being used as the combustion parameter for correction by the correcting means.

That is, in the present invention, the combustion parameter expressing the engine combustion state is calculated based on the actual combustion chamber pressure detected by a cylinder pressure sensor and crank angle, but for example only the heat release rate is not used as the combustion parameter for controlling all cases. The optimal combustion parameter for the combustion mode determined by the number of fuel injections and other fuel injection modes and the amount of EGR etc., that is, the parameter with the least error in the fuel injection mode or combustion mode, is selected from among a plurality of types of combustion parameters calculated based on the combustion chamber pressure and crank angle and used for the feedback control. By selecting the combustion parameter giving the smallest error in accordance with the fuel injection mode or combustion mode from among the plurality of types of combustion parameters in this way, it becomes possible to optimally control the combustion of a diesel engine.

Note that in the present specification, a parameter expressing the combustion state in a combustion chamber calculated based on the combustion chamber pressure is called a "combustion parameter".

As the combustion parameters able to be used in the present invention, for example, there are the following:

Maximum value Pmax of combustion chamber pressure after start of combustion (see FIG. 2) and crank angle where combustion chamber pressure becomes the maximum.

Crank angle when maximum value $(dP/d\theta)max$ (see FIG. 4) of rate of change of combustion chamber pressure to crank angle occurs.

Maximum value PVmax of product of combustion chamber pressure and combustion chamber actual volume and crank angle where PVmax occurs.

Difference ΔPVmax (=PVmax−PVmaxbase) between maximum value PVmax of product of combustion chamber pressure and combustion chamber volume and product PVmaxbase of combustion chamber pressure due only to compression in case of assuming that no combustion has occurred and combustion chamber actual volume at crank angle (θpvmax) where PVmax occurs (see FIG. 7).

Crank angle where maximum value $(dQ/d\theta)$ max of cylinder heat release rate occurs.

Overall amount of cylinder heat release ΣdQ.

Difference Pmax−Pmin between maximum value Pmax of cylinder pressure after start of combustion and cylinder minimum pressure Pmin (see FIG. 8) in interval until combustion is started in combustion chamber after compression top dead center.

Difference Pmax−Pmaxbase between maximum value Pmax of cylinder pressure after start of combustion and combustion chamber pressure Pmaxbase (see FIG. 9) due only to compression in case of assuming no combustion occurred at crank angle giving maximum cylinder pressure.

By using the suitable parameter for the injection mode or combustion mode from among these combustion parameters so as to control the fuel injection amount, injection timing, amount of EGR gas, etc., the combustion state of the engine is optimally controlled.

Further, in particular for control of the EGR, if using as the combustion parameter the time Δt from the start of fuel injection until the crank angle where the maximum value PVmax of the product of the above-mentioned combustion chamber pressure and combustion chamber actual volume occurs, good precision EGR control becomes possible.

Similarly, for control of the EGR, even if using as the combustion parameter the time Δtc after the start of fuel injection until the value of $PV^\kappa$ calculated based on the combustion chamber pressure P, the combustion chamber volume V determined from the crank angle θ, and the specific heat ratio κ of the combustion gas becomes the minimum value $PV^\kappa min$ or the time Δtc after the start of fuel injection from a fuel injector when the value of $PV^\kappa$ becomes the minimum value $PV^\kappa min$ to when it becomes the maximum value $PV^\kappa max$, good precision EGR control becomes possible.

Further, when performing multi-fuel injection, it is also possible to use as a combustion parameter the combustion period including the combustion start timing and end timing in a combustion chamber calculated using the rate of change $d(PV^\gamma)/d\theta$ of the parameter $PV^\gamma$ expressed as a product of the γ power of V and P with respect to the crank angle θ using the combustion chamber pressure P, the combustion chamber volume V determined from the crank angle θ, and a predetermined constant γ and to correct the injection timings and injection amounts (fuel injection pressures) of the different fuel injections so that these combustion parameters match with target values.

BRIEF DESCRIPTION OF DRAWINGS

FIG. 3 is a view for explaining selective use of a combustion parameter $(dP/d\theta)max$ in accordance with the injection mode, FIG. 5 is a view explaining selective use of a combustion parameter (d2P)/dθ2)max in accordance with the injection mode, FIG. 6 is a view explaining selective use of a combustion parameter $(dQ/d\theta)max$ in accordance with the injection mode.

Further.

Further.

BEST MODE FOR CARRYING OUT THE INVENTION

Below, embodiments of the present invention will be explained using the attached drawings.

Figure 1:
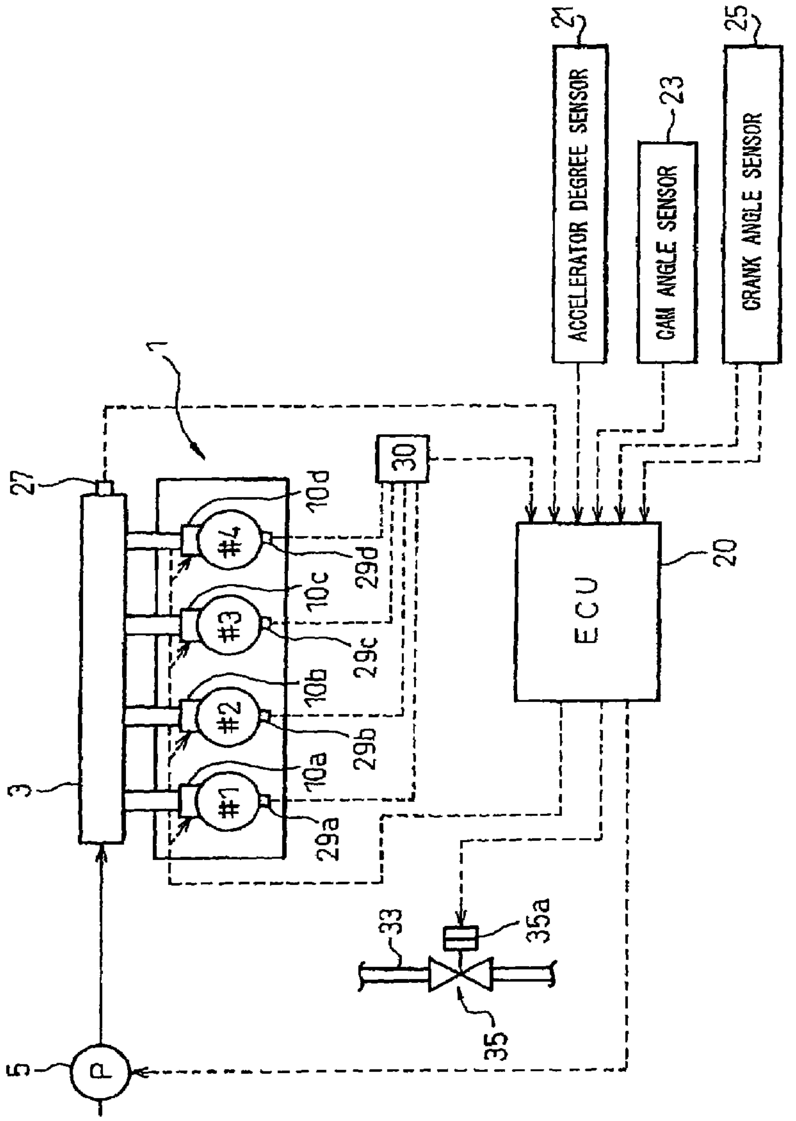
FIG. 1 is a view of the schematic configuration of an embodiment in the case of applying the fuel injection system of the present invention to a vehicular diesel engine.

FIG. 1 is a view of the schematic configuration of an embodiment in the case of applying the fuel injection system of the present invention to a vehicular diesel engine.

In FIG. 1, 1 indicates an internal combustion engine (in the present embodiment, a four-cylinder four-cycle diesel engine provided with a #1 to #4, that is, four, cylinders being used), while 10*a* to 10*d* indicate fuel injectors injecting fuel directly into the combustion chambers of the #1 to #4 cylinders of the engine. The fuel injectors 10*a* to 10*d* are connected through fuel passages (high pressure fuel pipes) to a common rail 3. The common rail 3 has the function of storing the pressurized fuel supplied from a high pressure fuel injection pump 5 and distributing the stored high pressure fuel through the high pressure fuel pipes to the fuel injectors 10*a* to 10*d*.

This embodiment is provided with an EGR system for recirculating part of the exhaust gas of the engine to the combustion chambers of the cylinders of the engine. The EGR system is provided with an EGR passage 33 for connecting the exhaust passage of the engine with the intake passage of the engine or the intake ports of the cylinders and an EGR valve 35 arranged in the EGR passage and having the function of a flow control valve for controlling the flow rate of the exhaust gas (EGR gas) recirculated from the exhaust passage to the intake passage. The EGR valve 35 is provided with a suitable type of actuator such as a stepper motor. The EGR valve opening degree is controlled in accordance with a control signal from a later explained ECU 20.

In FIG. 1, 20 shows an electronic control unit (ECU) for controlling the engine. The ECU 20 is configured as a microcomputer of a known configuration including a read only memory (ROM), a random access memory (RAM), a microprocessor (CPU), and input/output ports connected by a two-way bus. The ECU 20, in the present embodiment, controls the amount of discharge of the fuel pump 5 to control the pressure of the common rail 3 to a target value determined in accordance with the engine operating conditions so as to perform fuel pressure control and also sets the injection timing and injection amount of the fuel injection and the amount of EGR gas in accordance with the engine operating conditions and feedback controls the fuel injection amount, injection timing, amount of EGR gas, etc. so that the value of the combustion parameter calculated based on the output of the later explained cylinder pressure sensor matches the target value determined in accordance with the engine operating conditions so as to perform basic control of the engine.

For this control, in the present embodiment, the common rail 3 is provided with a fuel pressure sensor 27 for detecting the fuel pressure inside the common rail, while the accelerator pedal (not shown) of the engine 1 is provided near it with an accelerator opening degree sensor 21 for detecting the accelerator opening degree (amount of depression of accelerator pedal by driver). Further, in FIG. 1, 23 shows a cam angle sensor for detecting a rotational phase of a camshaft of the engine 1, while 25 shows a crank angle sensor for detecting a rotational phase of a crankshaft. The cam angle sensor 23 is arranged near the camshaft of the engine 1 and outputs a reference pulse every 720 degrees converted to crank rotational angle. Further, the crank angle sensor 25 is arranged near the crankshaft of the engine 1 and generates a crank angle pulse every predetermined crank rotational angle (for example, every 15 degrees).

The ECU 20 calculates the engine speed from the frequency of the crank rotational angle pulse signal input from the crank angle sensor 25 and calculates the fuel injection timings and fuel injection amounts from the fuel injectors 10*a* to 10*d* and the opening degree of the EGR valve 35 (amount of EGR gas) based on the accelerator opening degree signal input from the accelerator opening degree sensor 21 and the engine speed.

Further, in FIG. 1, 29*a* to 29*d* show known types of cylinder pressure sensors arranged at the cylinders 10*a* to 10*d* and detecting the pressures in the cylinder is combustion chambers. The combustion chamber pressures detected by the cylinder pressure sensors 29*a* to 29*d* are supplied through an AD converter 30 to the ECU 20.

In the present embodiment, the fuel pressure of the common rail 3 is controlled by the ECU 20 to a pressure in accordance with the engine operating conditions. For example, it is a high pressure of 10 MPa to 150 MPa or so and changes in a broad range. Further, with a diesel engine, generally before main fuel injection, pilot injection is performed for injecting a relatively small amount of fuel into the cylinder once or a plurality of times. The fuel injected into the cylinder by pilot injection burns before main fuel injection and raises the temperature and pressure inside the cylinder to a state suited to the combustion of main fuel injection, so pilot injection enables the combustion noise to be reduced.

Further, in a diesel engine injecting high pressure fuel like in the present embodiment, sometimes after injection or post injection is performed one or more times after main fuel injection. After injection is performed when the fuel injection amount of main fuel injection becomes great and injection at one time would cause the combustion state to deteriorate or to optimize the change in combustion pressure in the cylinder, while post injection is performed for raising the exhaust temperature for example.

In a diesel engine, there is no need to accurately control the air-fuel ratio to the extent of a conventional gasoline engine, so not much precision was demanded in control of the fuel injection amount either. With high pressure fuel injection like the above, however, not only main fuel injection, but also multi-fuel injection including pilot injection, after injection, etc. is required. (In the present description, the pilot injection, after injection, post injection, etc. performed other than the main fuel injection are referred to all together as "multi-fuel injection".)

Note that multi-fuel injection will be explained later in detail.

Therefore, in a diesel engine, the fuel injection has to be performed with a high precision. However, conventional fuel injection control is basically open loop control determining the fuel injection amount and fuel injection timing from maps preset based on the engine operating conditions (speed and accelerator opening degree). In actuality, there are factors causing error in the fuel injection amount such as shortening of the fuel injection time accompanying the increase in fuel injection pressure, the fluctuation in common rail pressure (fuel injection pressure) during fuel injection in common rail type fuel injection, changes in the fuel injection characteristics of a fuel injector accompanying use, etc. This makes accurate open loop control of the fuel injection amount, injection timing, etc. difficult.

Consequently, in the present embodiment, a parameter expressing the combustion state of the engine is used and the fuel injection amount, injection timing, etc. are feedback controlled so that the parameter becomes the optimal value set in accordance with the engine operating conditions (target value) to thereby maintain the combustion state of the engine at the optimal state.

The present embodiment uses as the parameter expressing the combustion state a parameter calculated based on the combustion chamber pressures detected by the cylinder pressure sensors 29*a* to 29*d* and the crank angle. A parameter expressing combustion in a combustion chamber calculated based on the combustion chamber pressure and crank angle is referred to as a "combustion parameter".

Note that there are countless parameters expressing the combustion state calculated based on the combustion chamber pressure, that is, combustion parameters. Theoretically, any of these may be used for feedback control of the fuel injection amount, injection timing, etc. In actuality however, it is learned that the precision of feedback control changes greatly in some cases depending on the combustion parameter used due to the fuel injection mode of the engine (main fuel injection alone or main fuel injection and multi-fuel injection in combination) and combustion mode (magnitude of amount of EGR etc.).

Therefore, the present embodiment sets a plurality of types of combustion parameters exhibiting good correlation with the combustion state in advance and selectively uses from among them the one giving the least control error in accordance with the fuel injection mode or combustion mode of the engine 1.

The same combustion parameter is never used regardless of the fuel injection mode or combustion mode. As explained above, by selectively using the optimal combustion parameter in accordance with the fuel injection mode or combustion mode from the plurality of types of combustion parameters, the present embodiment can maintain the optimal combustion state of a diesel engine at all times regardless of differences in the fuel injection mode or combustion mode.

Figure 2:
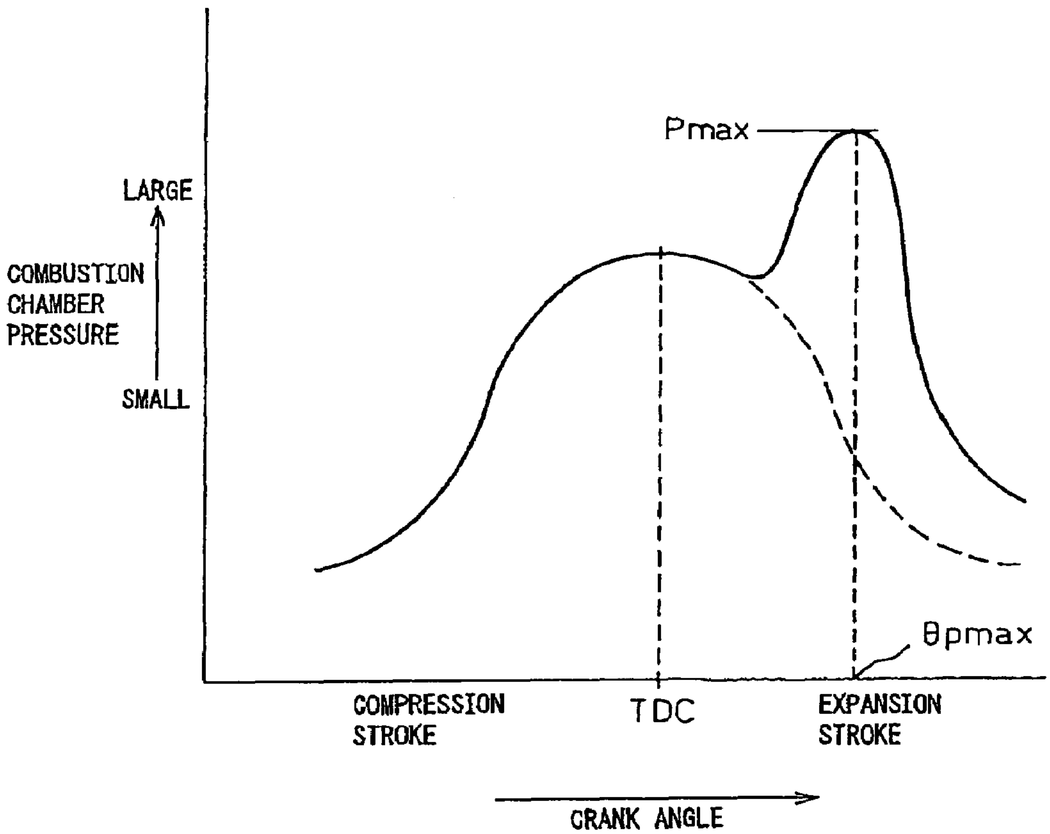
FIG. 2 is a view for explaining a combustion parameter Pmax.

Below, typical examples of the combustion parameters used in the present embodiment will be shown. In the present embodiment, the optimal combustion parameter for the fuel injection mode or combustion mode is selected for use as the combustion parameter from the following combustion parameters:

(1) Maximum value Pmax of combustion chamber pressure after start of combustion and crank angle θpmax where this maximum value occurs (FIG. 2)

Figure 7:
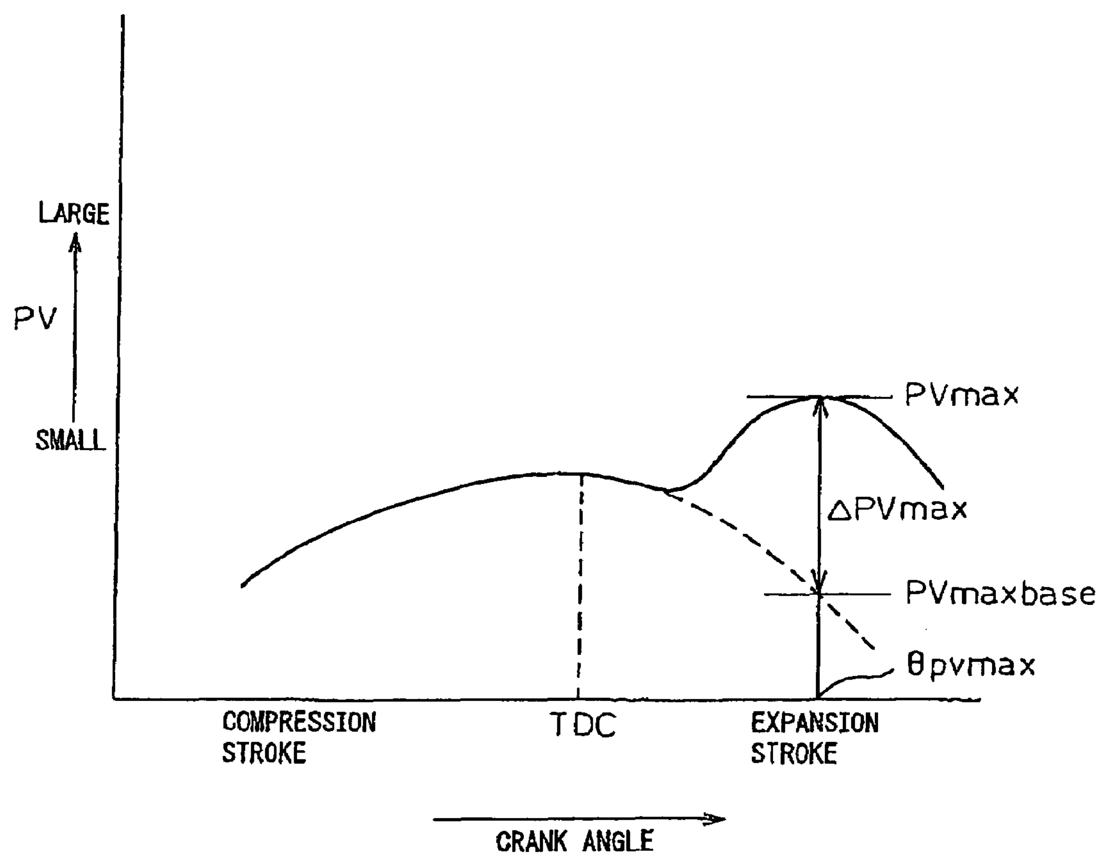
FIG. 7 is a view explaining a combustion parameter (ΔPVmax)

(2) Crank angle when local maximum value (maximal value) $(dP/d\theta)max$ of rate of change of combustion chamber pressure to crank angle occurs (3) Crank angle where local maximum value (maximal value) $(d2P/d\theta 2)max$ of second derivative of combustion chamber pressure occurs (4) Local maximum value PVmax of product of combustion chamber pressure and combustion chamber actual volume and crank angle θpvmax where that maximum value occurs (5) Difference ΔPVmax (=PVmax−Pvmaxbase) between the above PVmax and product PVmaxbase between combustion chamber pressure due only to compression in case of assuming that no combustion has occurred and combustion chamber actual volume at crank angle θpvmax where PVmax occurs (see FIG. 7)

(6) Crank angle where maximum value $(dQ/d\theta)$ max of cylinder heat release rate occurs (7) Overall amount of cylinder heat release ΣdQ (8) Difference Pmax−Pmin between maximum value Pmax of cylinder pressure after start of combustion and cylinder minimum pressure Pmin in interval after compression top dead center until combustion is started in combustion chamber (9) Difference Pmax−Pmaxbase between maximum value-Pmax of cylinder pressure after start of combustion and combustion chamber pressure (motoring pressure) Pmaxbase due only to compression in case of assuming no combustion occurred at crank angle where Pmax occurs

Figure 10:
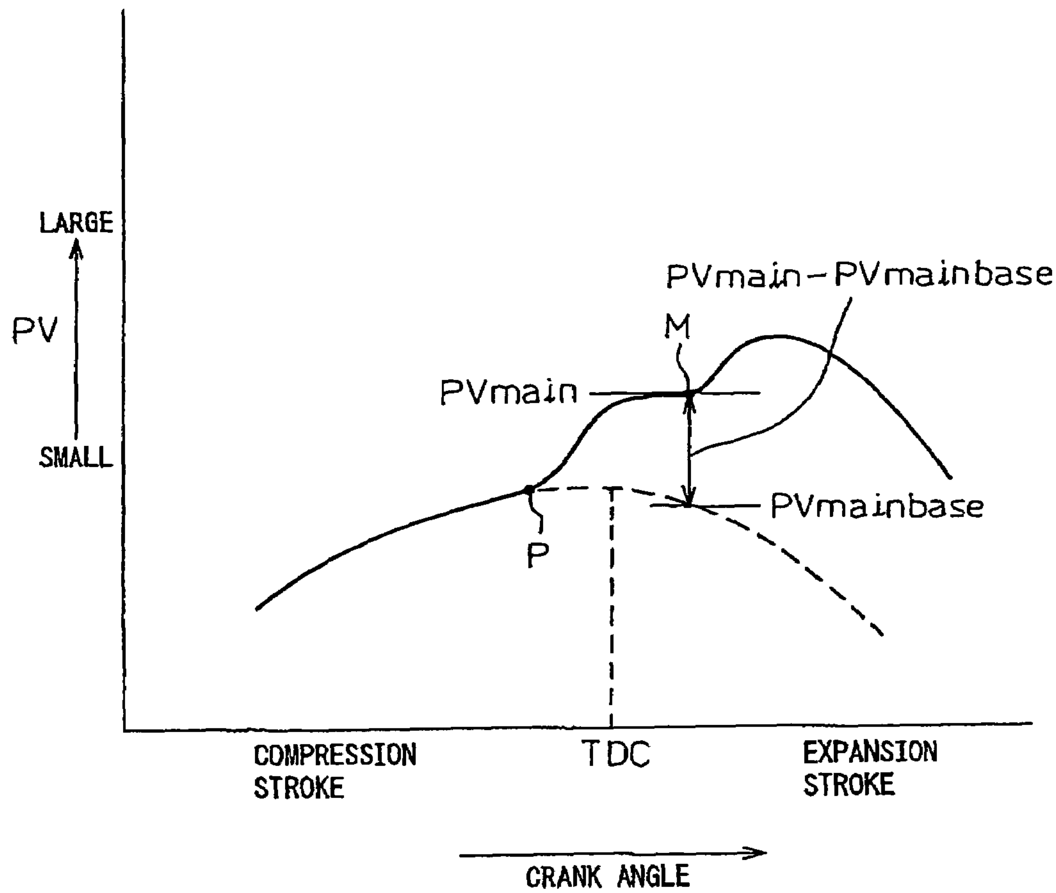
FIG. 10 is a view explaining a combustion parameter (PVmain−PVmainbase)

(10) Difference (PVmain−Pmainbase) between product PVmain of combustion chamber pressure when fuel injected by main fuel injection is ignited and combustion chamber actual volume and product PVmainbase of combustion chamber pressure due only to compression in case of assuming no combustion occurred and combustion chamber actual volume at crank angle where fuel injected by main fuel injection is ignited (see FIG. 10)

Figure 14:
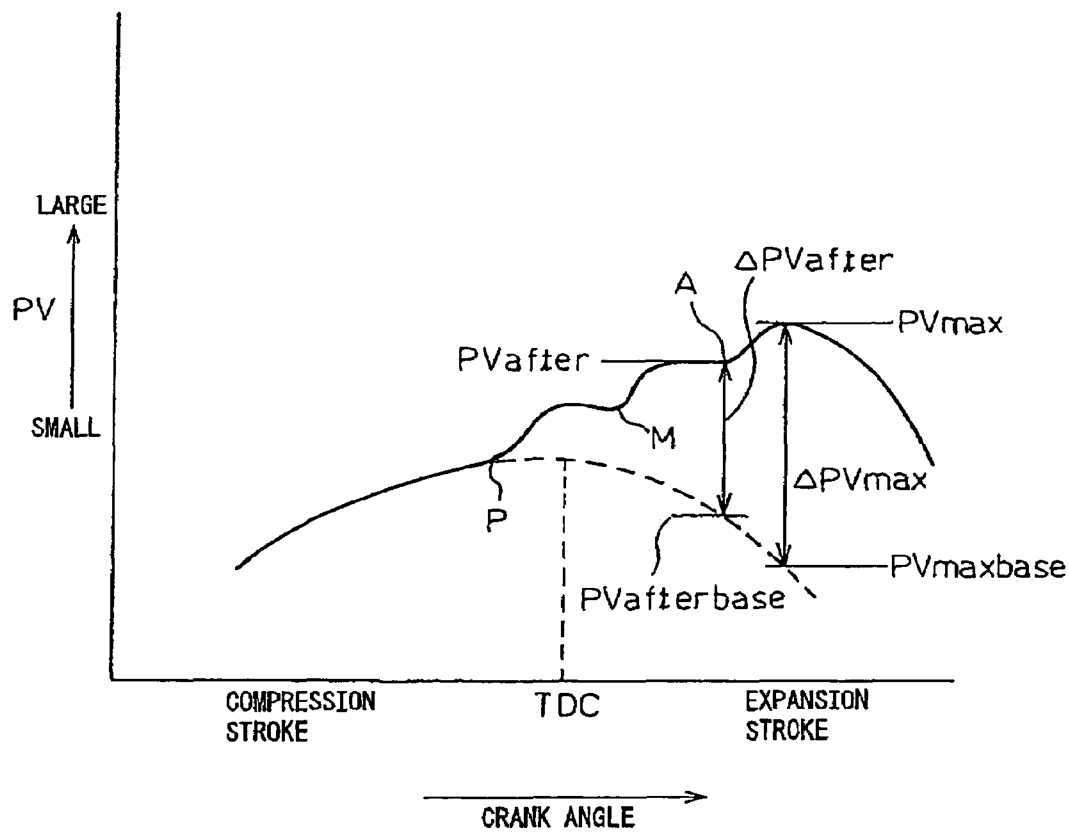
FIG. 14 is a view explaining a combustion parameter (ΔPVmax-ΔPVafter)

(11) Difference (ΔPVmax−ΔPVafter) between the above PVmax and the difference ΔPVafter between the product of the combustion chamber pressure when the fuel injected by after injection is ignited and the combustion chamber actual volume and the product of the combustion chamber pressure due only to compression in case of assuming no combustion occurred and combustion chamber actual volume at crank angle where fuel injected by after injection is ignited (see FIG. 10 and FIG. 14)

(12) Difference Ptdc-Pmin of combustion chamber pressure at top dead center of compression stroke and combustion chamber minimum pressure Pmin in interval after compression top dead center to when combustion is started in combustion chamber Below, these combustion parameters will be simply explained.

(1) Pmax and Crank Angle (θpmax) where Pmax Occurs

The maximum value of the combustion chamber pressure after the start of combustion usually appears after top dead center of the cylinder compression stroke and is expressed as the cylinder pressure when the combustion of the fuel injected by the main fuel injection causes the cylinder pressure to rise the most.

FIG. 2 shows the change in cylinder pressure in the expansion stroke from the suction stroke of a general diesel engine, wherein the ordinate indicates the pressure and the abscissa indicates the crank angle.

In FIG. 2, TDC indicates top dead center in the compression stroke (hereinafter referred to simply as "top dead center"). In a diesel engine, fuel is usually injected near right before top dead center. Combustion is started after the piston passes top dead center, so the cylinder pressure greatly rises after top dead center. Pmax, as shown in FIG. 2, is the maximum value of the combustion chamber pressure after the start of combustion, while θpmax is the crank angle when Pmax occurs.

Pmax and θpmax are easily found by monitoring the outputs of the cylinder pressure sensors 29*a* to 29*d*.

In the present embodiment, Pmax is used for correction of the injection amount of the main fuel injection, while θpmax is used for correction of the injection timing of the main fuel injection.

That is, in the present embodiment, the values (target values) of Pmax and θpmax in the optimal combustion state in the case of operating an engine while changing the engine operating conditions, that is, the engine speed and accelerator opening degree, are found in advance by experiments and are stored in advance in the ROM of the ECU 20 in the form of two-dimensional maps using the engine speed and the accelerator opening degree as parameters.

During engine operation, the ECU 20 finds the Pmax and θpmax of the cylinders based on the outputs of the cylinder pressure sensors 29*a* to 29*d* and reads out the target values of Pmax and θPmax from the engine speed and accelerator opening degree at that time using the above maps. Further, the fuel injection amount of the main fuel injection is corrected to increase or decrease it so that Pmax matches its target value, while the fuel injection timing of the main fuel injection is corrected so that θpmax matches its target value.

Due to this, the injection amount and injection timing of the main fuel injection are optimized and the combustion of the engine is maintained in the optimal state.

(2) Crank Angle when (dP/dθ)max Occurs

The crank angle when (dP/dθ)max occurs is used as a combustion parameter and the fuel injection timing is corrected so that the crank angle when (dP/dθ)max occurs becomes the target value.

When the fuel injected into a combustion chamber burns, the pressure inside the combustion chamber rises. Therefore, the value of the rate of change (dP/dθ) of the combustion chamber pressure increases each time fuel is injected due to the main fuel injection, multi-fuel injection, etc. The same number of peaks (dP/dθ) as the injections occur. Therefore, by using the crank angle where the maximum value (maximal value) (dP/dθ)max of the rate of change (dP/dθ) of combustion chamber pressure at the peaks occurs as a combustion parameter, it is possible to correct the injection timings of the fuel injections corresponding to the fuel injection modes.

For example, when main fuel injection and multi-fuel injection are performed, fuel is injected a plurality of times for one stroke cycle. In this case, a maximal value should occur for the combustion pressure itself corresponding to the combustion of the fuel injected by the fuel injections, but the rise in pressure in a combustion chamber is due to the different injections interfering with each other, so it is difficult to isolate and detect the maximal value (Pmax) for each injection.

As opposed to this, clear peak values of the rate of change of pressure (dP/dθ) appear with respect to the fuel injections. Therefore, by using the crank angle where (dP/dθ)max occurs as the combustion parameter, it is possible to accurately correct the injection timings of the injections even when performing multi-fuel injection.

Figure 4:
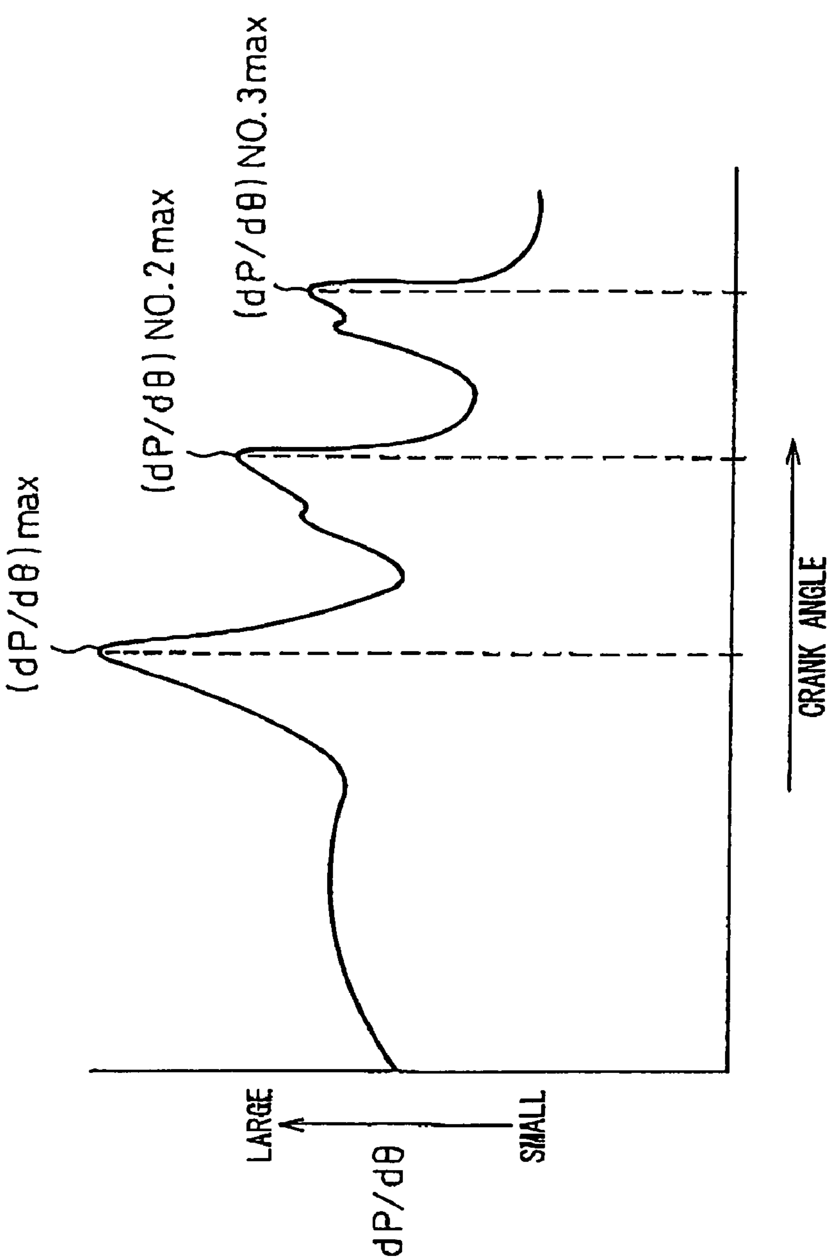
FIG. 4 is a view for explaining a combustion parameter $(dP/d\theta)max$.

FIG. 3 and FIG. 4 are views for explaining the selective use of the (dP/dθ)max corresponding to the injection mode. For example, in an engine where main fuel injection, pilot injection, and after injection are performed in one cycle, three peak values (dP/dθ)max of the rate of change of pressure are generated corresponding to the different injections. The (dP/dθ)max, (dP/dθ)No. 2max, and (dP/dθ)No. 3max in FIG. 3 signify the initial, second, and third peak values among the peak values of the rate of change of pressure occurring after the start of the compression stroke (expansion stroke from end of compression stroke) (see FIG. 4).

The first column in FIG. 3 shows the fuel injection mode. In the present embodiment, the main fuel injection is combined with multi-fuel injection of one pilot injection and/or after injection each, so four fuel injection modes can be conceived of: only main fuel injection, pilot injection+main fuel injection, main fuel injection+after injection, and pilot injection+main fuel injection+after injection.

For example, as shown in FIG. 3, when only main fuel injection is performed, the crank angle where (dP/dθ)max occurs is used to correct the injection timing of the main fuel injection.

Further, when the injection mode is the pilot injection+main fuel injection, the crank angle where (dP/dθ)max occurs is used to correct the injection timing of the pilot fuel injection, while the crank angle where (dP/dθ)No. 2max occurs is used to correct the injection timing of the main fuel injection.

Further, when the injection mode is the pilot injection+main fuel injection+after injection, the crank angles where (dP/dθ)max, (dP/dθ)No. 2max, and (dP/dθ) No. 3max occur are used to correct the injection timings of the pilot fuel injection, main fuel injection, and after fuel injection.

(3) Crank Angle where Maximum Value (d2P/dθ2)max of Second Derivative of Combustion Chamber Pressure Occurs There is also a maximal value (d2P/dθ2)max of the second derivative of the combustion chamber pressure for each injection like with the maximal value of the rate of change of pressure explained above. Therefore, by feedback control of the fuel injection amount and injection timing for each injection so that the crank angle where (d2P/dθ2)max occurs becomes the optimal value set in advance in accordance with the engine operating conditions, it is possible to maintain the engine combustion state at the optimal state.

FIG. 5 is a view explaining the selective use of the (d2P/dθ2)max in accordance with the injection mode in the same way as FIG. 3. As shown in FIG. 5, (d2P/dθ2)max can be selectively used in exactly the same way as (dP/dB)max. Further, for example, when the change of the crank angle of (dP/dθ)max when changing the fuel injection timing is gentle, it is effective if using (d2P/dθ2)max for correcting the injection timing instead of (dP/dθ)max.

(4) Maximum Value PVmax of Product of Combustion Chamber Pressure P and Combustion Chamber Actual Volume V and Crank Angle θpvmax where that Maximum Value Occurs PVmax has a strong correlation with the amount of cylinder heat release explained later. Good precision control becomes possible in particular when the fuel injection mode is only main fuel injection. Further, the combustion chamber actual volume V can be calculated in advance and stored as a function of the crank angle, so it is possible to reduce the load of calculation of the ECU 20 compared with the case of using the amount of cylinder heat release.

In the present embodiment, when performing only main fuel injection, the main fuel injection amount is feedback controlled so that the value of PVmax becomes the optimal value set in accordance with the engine operating conditions, while the main fuel injection timing is feedback controlled so that the crank angle θpvmax where PVmax occurs becomes the optimal value set in accordance with the engine operating conditions.

(5) Difference ΔPVmax (=PVmax−PVmaxbase) Between the Above PVmax and Product PVmaxbase Between Combustion Chamber Pressure Due Only to Compression in Case of Assuming that no Combustion has Occurred and Combustion Chamber Actual Volume at Crank Angle θpvmax where PVmax Occurs FIG. 7 is a view explaining ΔPVmax=PVmax−PVmaxbase in the same way as FIG. 2. The solid line in FIG. 7 shows the change of the PV value in the case of only main fuel injection. The product PV of the combustion chamber pressure P and the combustion chamber actual volume V, as shown in FIG. 7, greatly increases due to the rise in pressure when combustion occurs and becomes the maximum value PVmax after top dead center TOC.

On the other hand, the broken line in FIG. 7 shows the change of the PV value in the case of assuming no combustion occurred, that is, the PV value (PVbase) calculated using the combustion chamber pressure occurring due to only compression (motoring pressure). PVmaxbase is calculated as the value of PVbase at the crank angle where PVmax occurs.

ΔPVmax can be used for correcting the total fuel injection amount (overall fuel injection amount) in all fuel injection modes—not only when the fuel injection mode is only the main fuel injection, but also when there is pilot injection or after injection. In the present embodiment, the timing of each fuel injection is corrected so that the crank angle where (dP/dθ)max or (d2P/dθ2)max occurs matches the target value.

(6) Crank Angle where Maximum Value (dQ/dθ) max of Cylinder Heat Release Rate Occurs The cylinder heat release rate is expressed by the following formula using the cylinder pressures P detected by the cylinder pressure sensors 29*a* to 29*d* and the actual cylinder volume V:

$$dQ/d\theta=(\kappa\cdot P\cdot(dV/d\theta)+V(dP/d\theta))/(\kappa-1)$$

where P and V are functions of θ, and κ expresses the specific heat ratio of the air-fuel mixture.

The value of the cylinder heat release rate (dQ/dθ) increases each time fuel injected by the main fuel injection, multi-fuel injection, etc. is burned. In the same way as the case of the above-mentioned (dP/dθ), the same number of peaks as the injections occur. Therefore, by using the crank angle where each peak (dQ/dθ) occurs as a combustion parameter, it is possible to correct the fuel injection timings in accordance with the fuel injection modes.

The ECU 20 uses the crank angle detected by the crank angle sensor 25, the actual volume at the crank angle, and the cylinder pressures of the cylinders detected by the cylinder pressure sensors 29*a* to 29*d* to calculate the difference for each constant crank angle, finds the approximate value of (dQ/dθ) for each crank angle, and finds the crank angle where the (dQ/dθ)max of the maximal value of the values of (dQ/dθ) calculated occurs.

As explained above, there are the same number of (dQ/dθ)max as the number of fuel injections per cycle in the same way as the case of (dP/dθ)max.

FIG. 6 shows the selective use of the (dQ/dθ)max in accordance with the fuel injection mode. In FIG. 6, (dQ/dθ)max, (dQ/dθ)No. 2max, and (dQ/dθ)No. 3max signify the first, second, and third maximal values of (dQ/dθ). The selective use of the (dQ/dθ)max of FIG. 6 is exactly the same as the case of the (dP/dθ)max of FIG. 3, so a detailed explanation will be omitted here.

(7) Overall Amount of Cylinder Heat Release ΣdQ

The overall amount of cylinder heat release ΣdQ is found by cumulatively adding the values of the above (dQ/dθ) for one stroke cycle. ΣdQ corresponds to the overall amount of fuel fed to a combustion chamber, so for example can be used for correction of the overall fuel injection amount not only in main fuel injection alone, but also in a fuel injection mode including pilot injection or after injection. Note that the injection timing is corrected by any of the methods explained separately above.

Figure 8:
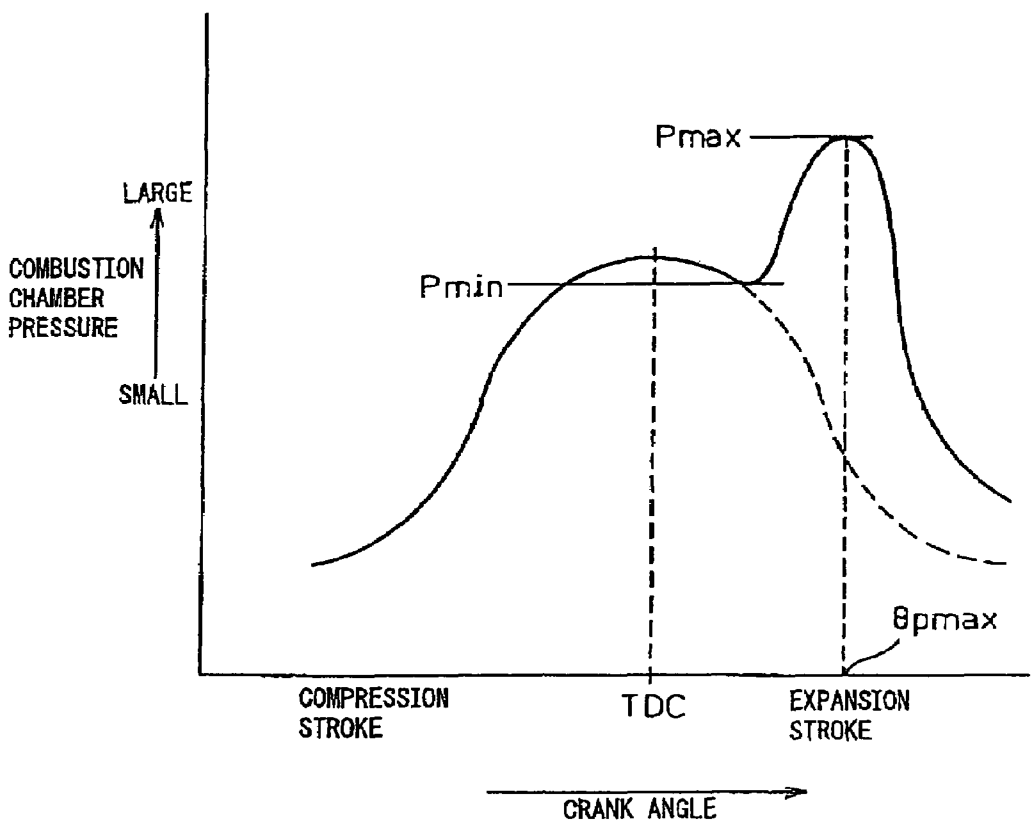
FIG. 8 is a view explaining a combustion parameter (Pmax−Pmin)

(8) Difference Pmax−Pmin between maximum value Pmax of cylinder pressure after start of combustion and cylinder minimum pressure Pmin in interval after compression top dead center until combustion is started in combustion chamber FIG. 8 is a view showing Pmax and Pmin similar to FIG. 2. In this case, the main fuel injection amount is feedback controlled so that the value of Pmax−Pmin becomes the target value, while the main fuel injection timing is controlled so that the crank angle θpmax where Pmax occurs becomes the target value. Pmax−Pmin is suitable for the case where the fuel injection mode is only the main fuel injection.

(9) Difference Pmax−Pmaxbase Between Maximum Value

Figure 9:
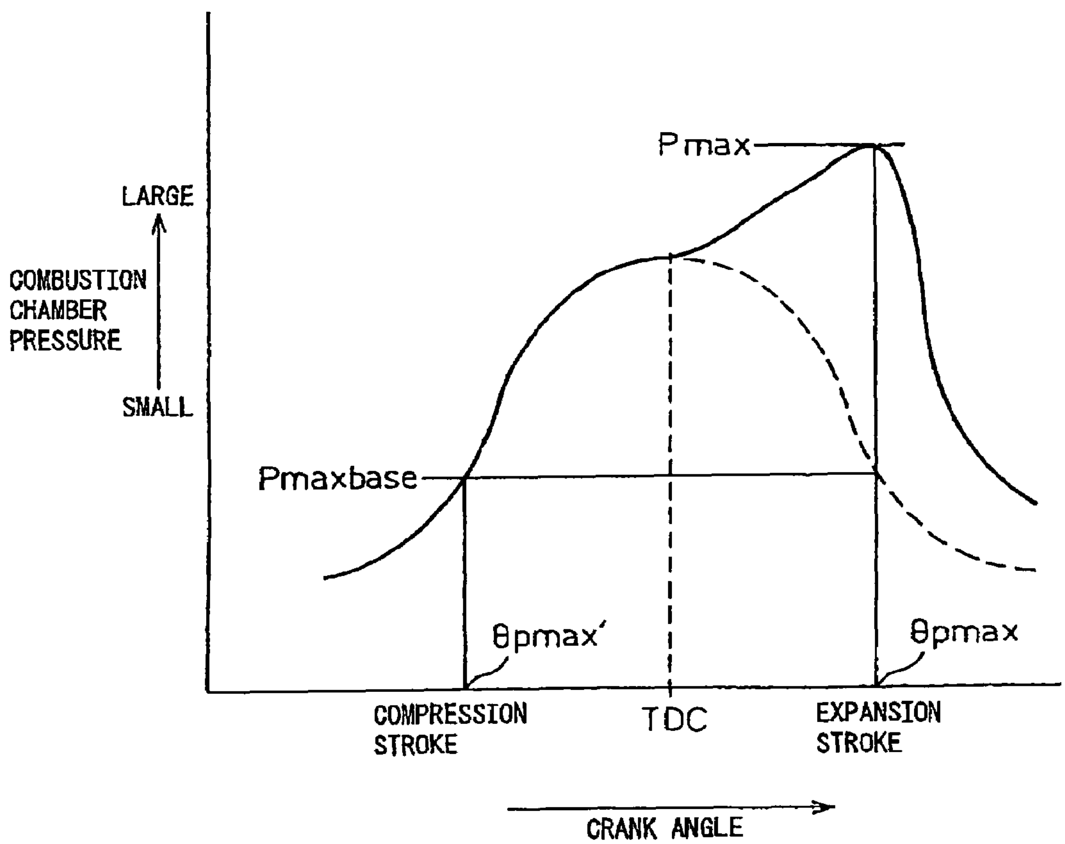
FIG. 9 is a view explaining a combustion parameter (Pmax−Pmaxbase)

Pmax of cylinder pressure after start of combustion and combustion chamber pressure (motoring pressure) Pmaxbase due only to compression in case of assuming no combustion occurred at crank angle where Pmax occurs FIG. 9 is a view showing Pmax and Pmaxbase similar to FIG. 2. As shown in FIG. 9, Pmaxbase is the change in the combustion chamber pressure in the case of assuming no combustion occurs at the crank angle θpmax where Pmax occurs, that is, the combustion chamber pressure occurring due to only compression (motoring pressure). Pmaxbase can be found by calculation, but as shown in FIG. 9, the motoring pressure is symmetrical right-left with respect to compression top dead center, so in the present embodiment, the pressure detected by the cylinder pressure sensor at the compression stroke crank angle θpmax' symmetrical with θpmax about the compression top dead center TDC is used as Pmaxbase.

Pmax−Pmaxbase is used to correct the fuel injection amount of the main fuel injection when the fuel injection mode is only the main fuel injection in the same way as the above Pmax−Pmin, but is particularly suitable for correction of the fuel injection amount in the case where the minimum pressure Pmin does not appear after top dead center in the change of the combustion chamber pressure as shown in FIG. 9. Further, in the present embodiment as well, the injection timing of the main fuel injection is corrected so that the crank angle θpmax where Pmax occurs matches the target value.

(10) PVmain−Pmainbase

FIG. 10 is a view for explaining the combustion parameter PVmain-PVmainbase. In FIG. 10, the abscissa shows the crank angle, while the ordinate shows the product PV of the combustion chamber pressure P and the combustion chamber actual volume V at the different crank angles.

FIG. 10 shows the case where pilot injection is performed in addition to main fuel injection.

As shown in FIG. 10, the PV value rapidly rises when the fuel injected by the pilot injection is ignited (FIG. 10, point P) and when the fuel injected by the main fuel injection is ignited (same, point M).

As shown in FIG. 10, PVmain is the PV value when the fuel of the main fuel injection is ignited (point M). Further, PVmainbase is the product of the combustion chamber pressure (motoring pressure) P obtained by only compression and the actual combustion chamber volume V at the crank angle where the fuel of the main fuel injection is ignited (point M).

The value of PVmain can be easily detected as the point where the second derivative of the PV value becomes positive. The motoring pressure Pmainbase is found from the crank angle at that time. This Pmainbase and the combustion chamber actual volume V are used to calculate PVmainbase.

PVmain−PVmainbase is particularly suitable for correction of the pilot injection amount in the case of performing pilot injection.

(11) ΔPVmax−ΔPVafter

FIG. 14 is a view explaining ΔPVmax−ΔPVafter similar to FIG. 10.

FIG. 14 shows the case where pilot injection and after injection are performed in addition to main fuel injection. Therefore, in FIG. 14, there are three points where the PV value rapidly increases (FIG. 14, points P, M, and A). Further, the crank angle where the maximum value of PV, that is, PVmax, occurs becomes the point of time where after injection is performed after the start of combustion of the fuel of the main fuel injection.

As explained above, ΔPVmax is found as the difference between the maximum value of PV, that is, PVmax, and the value of PV at the time of motoring at a crank angle where PVmax occurs, that is, PVmaxbase.

Further, ΔPVafter is found as the difference between the product PVafter of the combustion chamber pressure detected by the cylinder pressure sensor when the fuel due to the after injection starts to burn, that is, at the point of the start of a rapid increase in the PV value (point A) occurring third after the start of combustion in FIG. 14, and the combustion chamber actual volume at that time and the value of PV at the time of motoring at the crank angle of point A, that is, PVafterbase.

That is, $$\Delta PVmax = PVmax - PVmaxbase$$

$$\Delta PVafter = PVafter - PVafterbase$$

The combustion parameter ΔPVmax−ΔPVafter is particularly suitable for correction of the after injection amount in the case of performing after injection.

Figure 11:
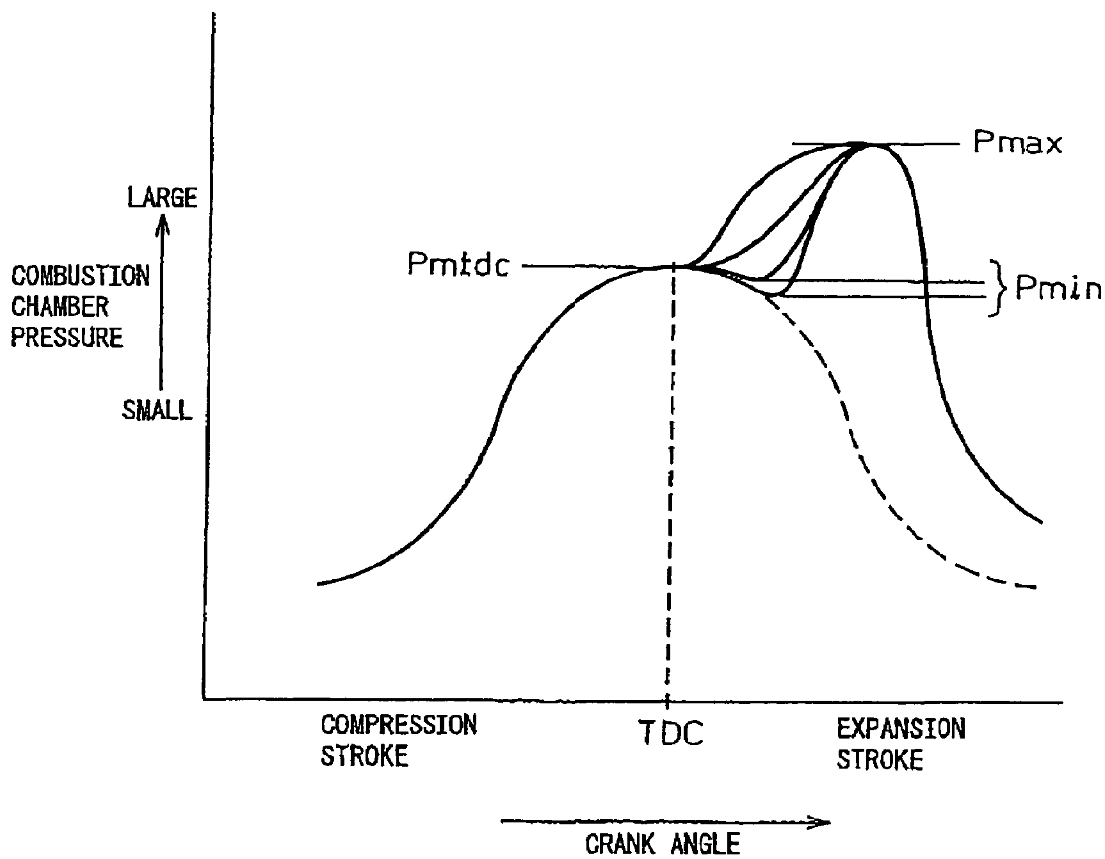
FIG. 11 is a view explaining a combustion parameter (Pmtdc−Pmin)

(12) Difference Ptdc−Pmin of Combustion Chamber Pressure Pmtdc at Top Dead Center of Compression Stroke and Combustion Chamber Minimum Pressure Pmin in Interval after Compression Top Dead Center to when Combustion is Started in Combustion Chamber FIG. 11 is a view showing the change in the combustion chamber pressure in the case of maintaining the fuel injection amount constant while adjusting the amount of EGR gas to change the combustion air-fuel ratio in the same way as FIG. 2. When maintaining the fuel injection amount constant, the combustion pressure maximum value Pmax will not change much at all regardless of a change in the air-fuel ratio, but the lower the air-fuel ratio (the higher the EGR rate), the further the ignition timing of the air-fuel mixture from compression top dead center. The difference between the combustion chamber pressure at compression top dead center and the combustion chamber minimum pressure Pmin in the period from top dead center to the start of combustion changes in accordance with the air-fuel ratio.

For this reason, by using as the combustion parameter the difference Pmtdc-Pmin between the combustion chamber pressure Pmtdc due to compression at the compression stroke top dead center and the minimum pressure Pmin after top dead center and controlling the amount of EGR (for example, the throttle valve opening degree) so that this value becomes the target value, the combustion air-fuel ratio can be optimally controlled. Further, in this case, the main fuel injection amount and main fuel injection timing are controlled using Pmax and the crank angle at which Pmax occurs.

Note that Pmtdc has to be the pressure in the state where no combustion occurs at the compression stroke top dead center, that is, the pressure due to only compression in the cylinder. Therefore, to prevent error from occurring when combustion etc. due to the pilot injection is started, the value calculated by the following formula is used as Pmtdc;

$$Pmtdc = Pbdc\cdot(\epsilon)^{\kappa} = Pm\cdot(\epsilon)^{\kappa}$$

where Pbdc is the combustion chamber pressure at the suction stroke bottom dead center and is substantially equal to the intake pipe pressure (supercharging pressure) Pm. Further; is the compression ratio of a cylinder, while κ is the specific heat ratio of the air-fuel mixture and is preferably found by experiments.

As explained later, control using the two combustion parameters of Pmax and Pmtdc-Pmin is particularly effective at the transient times such as when switching combustion modes between normal combustion and low temperature combustion.

Note that it is learned that the combustion parameters shown below may also be used in addition to the above combustion parameters:

(a) Pmax−Pmtdc

Pmax and Pmtdc (see FIG. 11) were explained above, but Pmax-Pmtdc can be used for correction of the overall fuel injection amount (main fuel injection amount) when only main fuel injection is performed.

(b) PVmain

PVmain was explained for the case of use of PVmain-PVmainbase as the combustion parameter in FIG. 10, but PVmain expresses the amount of heat in a cylinder right before the fuel of the main fuel injection ignites, so by correcting the pilot injection amount so that PVmain becomes a value predetermined in accordance with the operating conditions, it is possible to control the pilot injection amount to a suitable value.

(c) Pmain−Pmainbase

Figure 15:
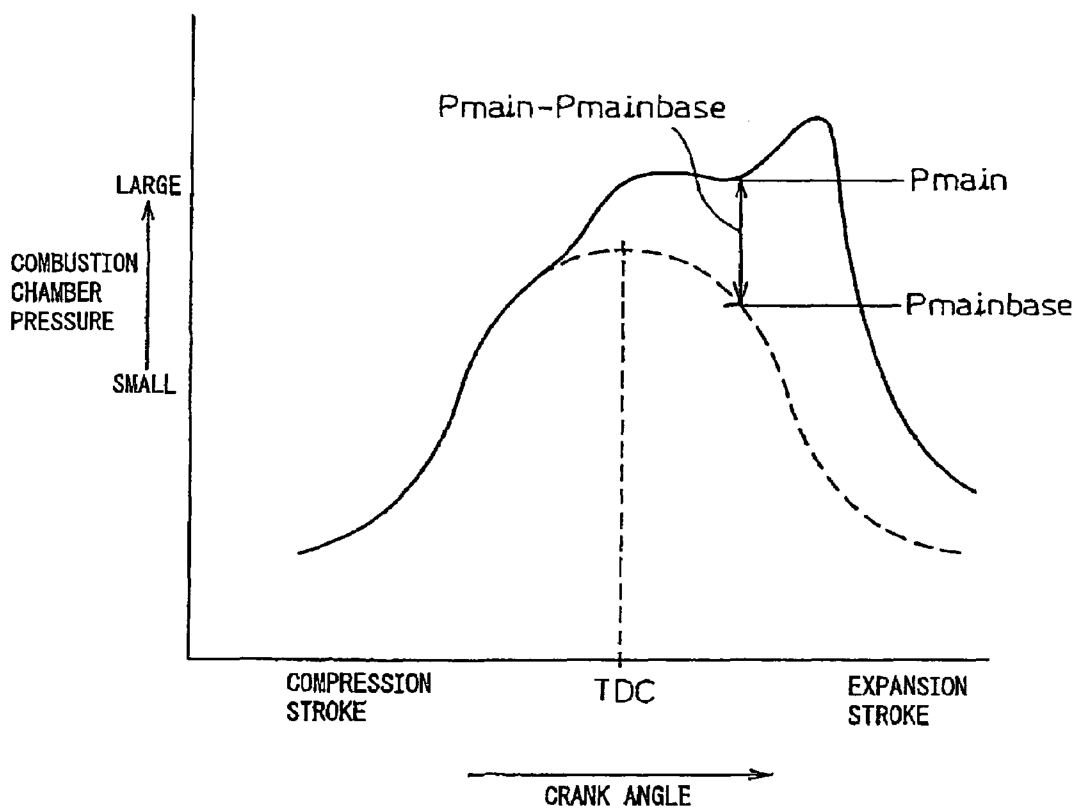
FIG. 15 is a view explaining a combustion parameter (Pmain−Pmainbase)

Pmain and Pmainbase are the combustion chamber pressure when the fuel of the main fuel injection ignites and the motoring pressure at the crank angle where this Pmain occurs (see FIG. 15). Pmain-Pmainbase also is suitable for correction of the pilot injection amount in the same way as PVmain−PVmainbase.

(d) ΣdQmain

ΣdQmain is the value of the cylinder heat release rate (dQ/dθ) explained above cumulatively added from when the compression stroke starts to when the fuel due to the main fuel injection ignites (integral value). ΣdQmain corresponds to the overall amount of heat supplied to the combustion chamber before the fuel of the main fuel injection starts to burn, so for example in a fuel injection mode including pilot injection, it corresponds to the injection amount of the pilot injection. For this reason, by using ΣdQmain as the combustion parameter, it is possible to suitably correct the pilot injection amount.

(e) ΣdQ−ΣdQafter

ΣdQ is the overall amount of cylinder heat release explained above, while ΣdQafter is the cumulative value (integrated value) of the cylinder heat release rate (dQ/dθ) from the start of the compression stroke to when the fuel of the after injection ignites. ΣdQafter corresponds to the total of the amount of heat supplied to the combustion chamber up to when the fuel of the after injection starts to burn, so ΣdQ−ΣdQafter corresponds to the total of the amount of heat supplied to the combustion chamber due only to after injection, that is, the fuel injection amount of the after injection. Therefore, by using ΣdQ−ΣdQafter as the combustion parameter, it is possible to suitably correct the injection amount of the after injection.

Figure 12:
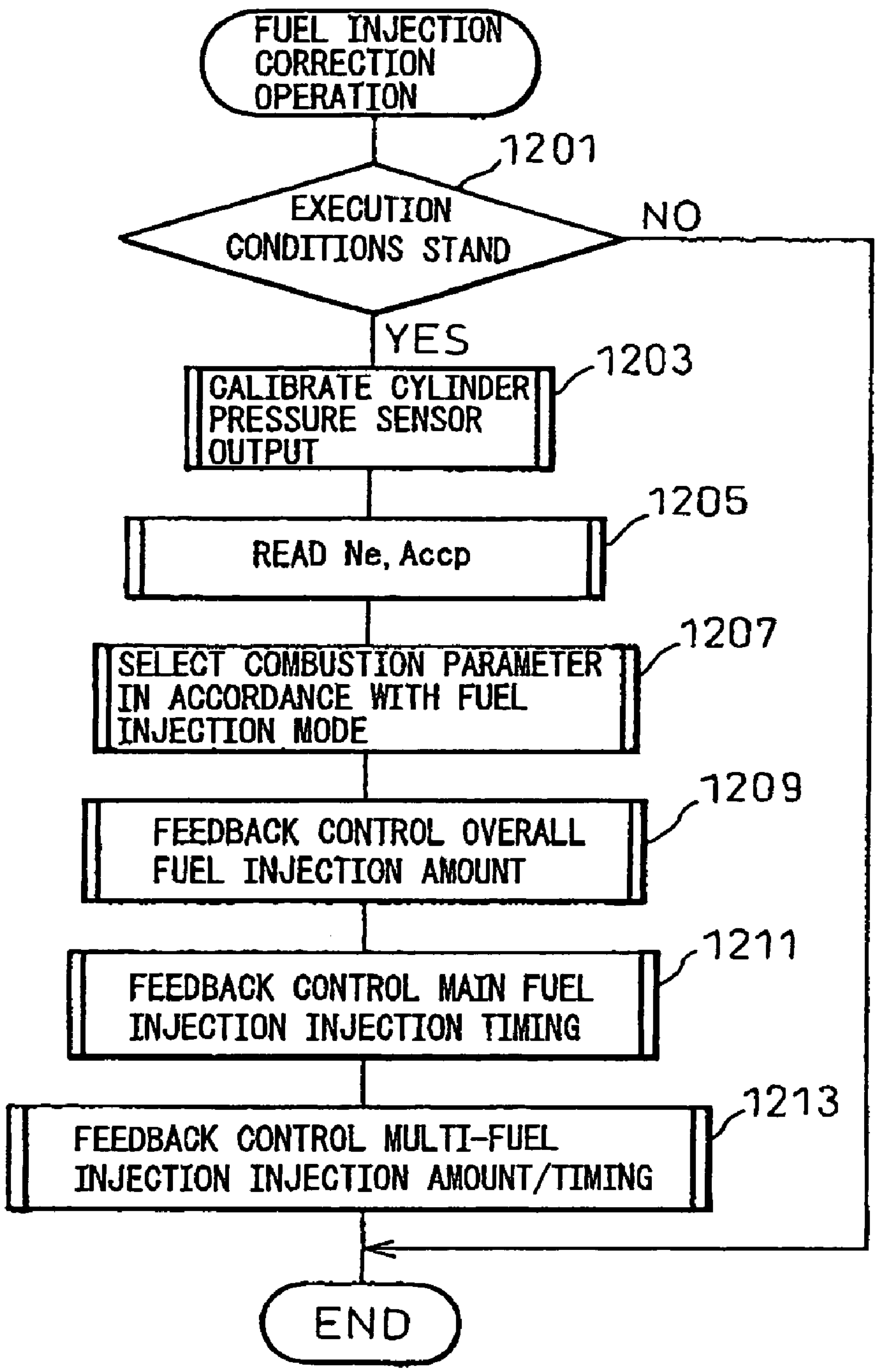
FIG. 12 is a flow chart explaining an embodiment of a fuel injection correction operation of the present invention.

Next, the flow chart of FIG. 12 will be used to explain the fuel injection correction operation of the present embodiment.

The operation of FIG. 12 is executed by the ECU 20. Below, the operation of the steps of FIG. 12 will be explained.

Step 1201:

Step 1201 shows the judgment as to whether the conditions for execution of the control operation stand. At step 1201, it is decided whether to execute the control operation of step 1203 on based on the cumulative operating time of the engine or the cumulative running distance of the vehicle.

For example, when the cumulative operating time from when the vehicle started being operated has not reached a predetermined value (or when the running distance of the vehicle has not reached a predetermined value), the initial friction of the engine parts is large, so if correcting the injection amount or injection timing, error is likely to occur. Accordingly, the control operation of FIG. 12 is executed only when the cumulative operating time of the engine is a predetermined time or more.

Step 1203:

At step 1203, the cylinder pressure sensors 29a to 29d are calibrated. Here, the deviations of the zero points (offsets) and gains of the cylinder sensors are corrected.

Figure 13:
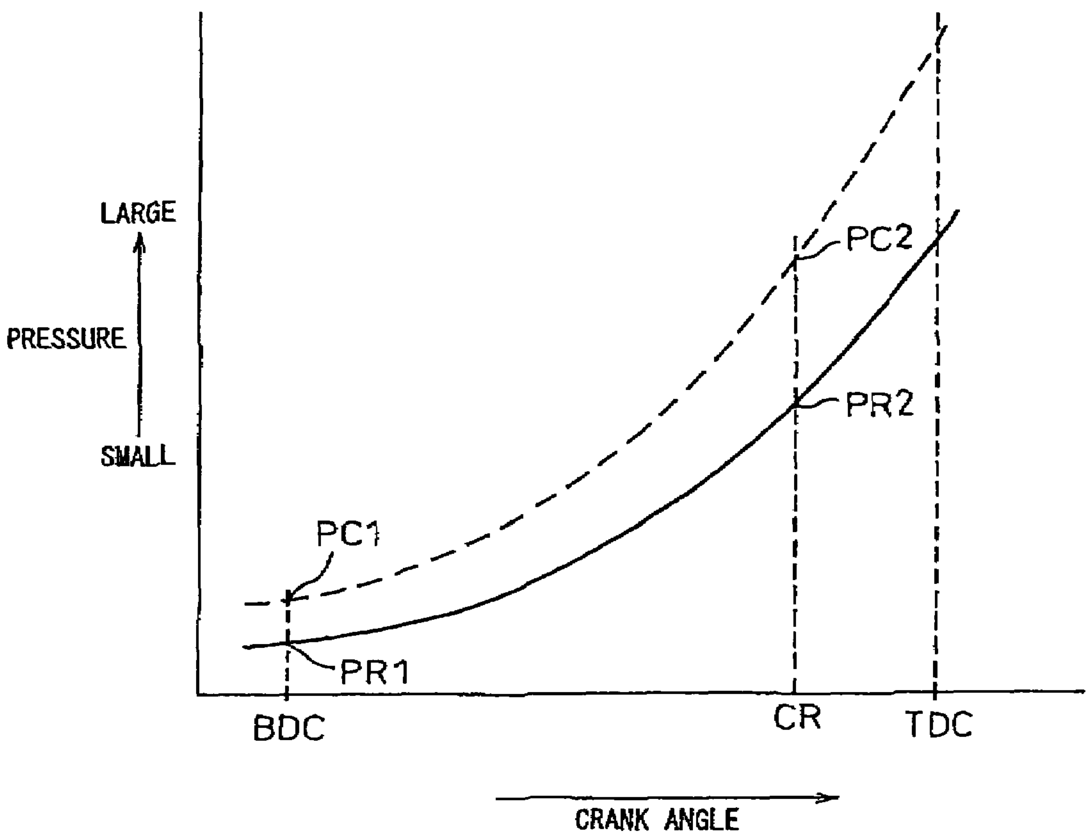
FIG. 13 is a view explaining a principle of calibration of a cylinder pressure sensor.

FIG. 13 is a view for explaining the calibration of a cylinder pressure sensor.

In FIG. 13, the abscissa shows the crank angle, while the ordinate shows the cylinder pressure. Further, BDC of the abscissa indicates bottom dead center of the suction stroke, while TDC indicates top dead center of the compression stroke. Further, CR is a suitable crank angle before the start of combustion during the compression stroke.

The solid line in FIG. 13 shows the change of the actual output of a cylinder pressure sensor, while the broken line shows the change of the true cylinder pressure. Further, PR1 and PC1 show the output of the cylinder pressure sensor and true cylinder pressure at the suction stroke bottom dead center BDC, while PR2 and PC2 show the output of the cylinder pressure sensor and true cylinder pressure at the crank angle CR.

Here, if the true cylinder pressures PC1 and PC2 are known, the offset ΔPR of the cylinder pressure sensor is found as ΔPR=PC1−PR1, the deviation K of the gain is found as K=PC2/(PR2+ΔPR), and the true cylinder pressure PC when the output of the cylinder pressure sensor is PR can be found as:

$$PC=K\cdot(PR+\Delta PR)$$

Here, PC1 is the cylinder pressure at the suction stroke bottom dead center and is approximately equal to the suction pressure (supercharging pressure) Pm. Therefore, the offset ΔPR becomes ΔPR=Pm−PR1.

Further, the true cylinder pressure PC2 at the crank angle CR is calculated as $PC2=Pm\cdot(\epsilon cr)^{\kappa}$ using PC1=Pm. Here, εcr is the compression ratio at the crank angle Cr, while κ is the specific heat ratio of the air-fuel mixture. That is, the value of the gain deviation K is found as $$K=Pm\cdot(\epsilon cr)^{\kappa}/(PR2+\Delta PR)$$

In the present embodiment, before executing the control operation, the ECU 20 finds the above offset ΔPR and gain K based on the output of the cylinder pressure sensor at the suction stroke bottom dead center and crank angle CR and the engine supercharging pressure Pm and in the following operation converts the output PR of the cylinder pressure sensor to the true cylinder pressure PC (PC=K·(PR+ΔPR)) for use.

Step 1205:

At step 1205, the engine speed Ne and the accelerator opening degree Accp are read from the crank angle sensor 25 and the accelerator opening degree sensor 21. Ne and Accep are used for setting the target value of a combustion parameter explained later. Note that in the present embodiment, the fuel injections and fuel injection timings of the main fuel injection and multi-fuel injection are calculated based on Ne and Accp by a not shown fuel injection control operation performed separately by the ECU 20.

Step 1207:

At step 1207, the combustion parameter giving the least error is selected based on the current fuel injection mode of the engine (only main fuel injection or main fuel injection+multi-fuel injection).

In the present embodiment, the value of the combustion parameter selected in accordance with the fuel injection mode from for example the above-mentioned 11, combustion parameters is calculated. When for example the current fuel injection mode is only the main fuel injection, Pmax, PVmax, etc. are selected as the combustion parameters, while when for example the current fuel injection mode is the pilot injection+main fuel injection+after injection multi-fuel injection, PVmain−PVmainbase, ΔPVmax, ΔPVmax−ΔPVafter, etc. are selected as the combustion parameters for correcting the fuel injection amounts, while (dP/dθ)max, (dQ/dθ)max, etc. are selected for correcting the fuel injection timings of the fuel injections.

Step 1209 and Step 1211:

At step 1209 and step 1211, first the overall fuel injection amount and the injection timing of the main fuel injection are corrected. That is, at step 1209, first the magnitude of the combustion parameter (for example, ΔPVmax) selected at step 1207 is calculated based on the cylinder pressure sensor output. The overall fuel injection amount is corrected to increase or decrease it until this ΔPVmax matches the target value of ΔPVmax determined from the engine speed Ne and the accelerator opening degree Accp.

Note that the target values of the combustion parameters are found from experiments etc. in advance and stored as numerical value maps using Ne and Accep in the ROM of the ECU 20.

Further, at step 1211, similarly the crank angle where the state selected as the combustion parameter (for example, (dP/dθ)max) occurs is detected based on the output of the cylinder pressure sensors, and the injection timing of the main fuel injection is corrected until the crank angle matches with the target value determined from the speed Ne and the accelerator opening degree Accp.

Step 1213:

Step 1213 shows the correction of the injection amount and injection timing of the multi-fuel injection in the case of execution of multi-fuel injection. At this step, for example, the injection amount and injection timing of the pilot injection and/or after injection are corrected until PVmain-PVmainbase, ΔPVmax−ΔPVafter, (dP/dθ)max, (dP/dθ)No. 3max, and other combustion parameters match their target values.

The specific correction is similar to that for the main fuel injection, so a detailed explanation will be omitted here, but in the present embodiment, first, the overall fuel injection amount, the injection amount and injection timing of the main fuel injection, etc. are corrected, then the injection timing and injection amount of the multi-fuel injection (pilot injection and after injection) are corrected. This is because even when performing multi-fuel injection, the overall fuel injection amount has the greatest effect on the output torque, so first the overall fuel injection amount is optimally corrected, then the injection amount and injection timing of the main fuel injection are optimally corrected so as to bring the combustion state of the engine close to the ideal state, then the injection amount and injection timing of the multi-fuel injection are corrected for fine adjustment of the combustion state.

As explained above, by performing the correction operation of FIG. 12, the injection amounts and injection timings of the different fuel injections are corrected to suitable values and the combustion state of the engine is optimized.

Next, another embodiment of the present invention will be explained.

In the present embodiment, the fuel injection is controlled at the transient time of switching of combustion modes. In the present embodiment, the engine 1 operates while switching between the two combustion modes of a normal diesel combustion mode, that is, a combustion mode injecting fuel and burning with a high air-fuel ratio at the end of the compression stroke, and a low temperature combustion mode, that is, a combustion mode greatly advancing the fuel injection timing to form a premixed air-fuel mixture in the cylinder and greatly increasing the amount of EGR gas to burn with a low air-fuel ratio. Further, when switching the combustion modes, a combustion parameter is used for feedback control of the fuel injection and a throttle valve provided in the engine intake passage is feedback controlled to adjust the amount of intake air and optimize the air-fuel ratio.

As will be explained in FIG. 11, there is a good correlation between (Pmtdc-Pmin) among the combustion parameters and the air-fuel ratio. When switching between the normal diesel combustion mode and low temperature combustion mode, the air-fuel ratio and fuel injection timing greatly change. Here, the air-fuel ratio is adjusted by adjusting the opening degree of the throttle valve to change the amount of EGR gas, but the change of the amount of EGR gas takes a relatively long time, while the fuel injection timing can be changed in a short time. Therefore, in the present embodiment, at the time of switching, first, Pmax is used as a combustion parameter to correct the fuel injection amount, then the throttle valve opening degree is used as a combustion parameter (Pmtdc−Pmin) for correction, then the crank angle where Pmax occurs after correction of the throttle valve opening degree is used as a combustion parameter to correct the fuel injection timing.

The amount of EGR gas, which is inherently slow in speed of change, is first corrected and then the injection timing is corrected in this way because at the start of the switch, generally the change of the combustion parameter becomes small and the sensitivity becomes low relative to the change of the fuel injection timing and so as to prevent the problem of dispersion of control in the case of simultaneously controlling the air-fuel ratio and injection timing.

Figure 16:
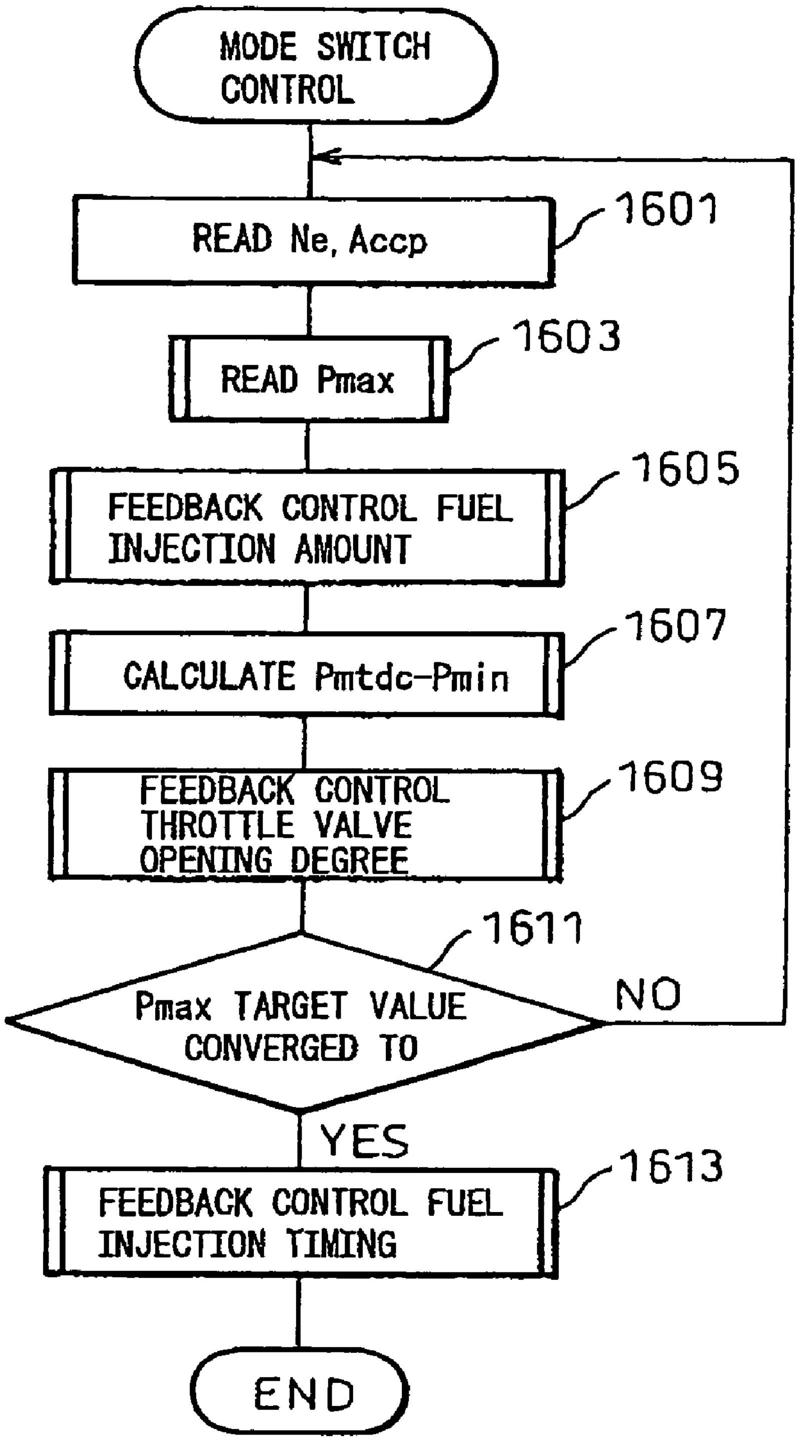
FIG. 16 is a flow chart explaining a fuel injection control operation at the time of switching combustion modes.

FIG. 16 is a flow chart showing an outline of the combustion mode switching control operation. This operation is executed by the ECU 20.

In the operation of FIG. 16, at step 1601, first, the engine speed Ne and accelerator opening degree Accp are read from the crank angle sensor 25 and accelerator opening degree sensor 21, then at step 1603, Pmax is calculated based on the cylinder pressure sensor output. Further, at step 1605, the fuel injection amount is feedback controlled until the value of this Pmax matches the Pmax target value determined from the engine speed Ne and the accelerator opening degree Accp.

Further, after the feedback control of the fuel injection amount of step 1605 is completed, at step 1607, the parameter (Pmtdc−Pmin) is calculated based on the cylinder pressure sensor output and at step 1609, the throttle valve opening degree is feedback controlled until the value of (Pmtdc−Pmin) matches the target value determined from the engine speed Ne and the accelerator opening degree Accp.

Further, after the throttle valve opening degree finishes being adjusted at step 1609, at step 1611, it is again judged if the valve of Pmax is converging on the target value. When Pmax is away from the target value by a predetermined amount or more, the operation from step 1601 is executed again.

When Pmax is converging on the target value at step 1611, the routine next proceeds to step 1613 where the crank angle where Pmax occurs is calculated from the cylinder pressure sensor output and the fuel injection timing is feedback controlled until the crank angle matches with the target value determined from the engine speed Ne and the accelerator opening degree Accp.

By the switching control of FIG. 16, even during transient operation such as combustion mode switching, the engine combustion state is optimally controlled.

Next, control of the amount of EGR gas based on a combustion parameter will be explained in detail. In the present embodiment, as combustion parameters, PVmax, θpvmax, ΔPVmax, and Δt are used for feedback control of the amount of EGR gas, the fuel injection amount, and the fuel injection timing.

Figure 17:
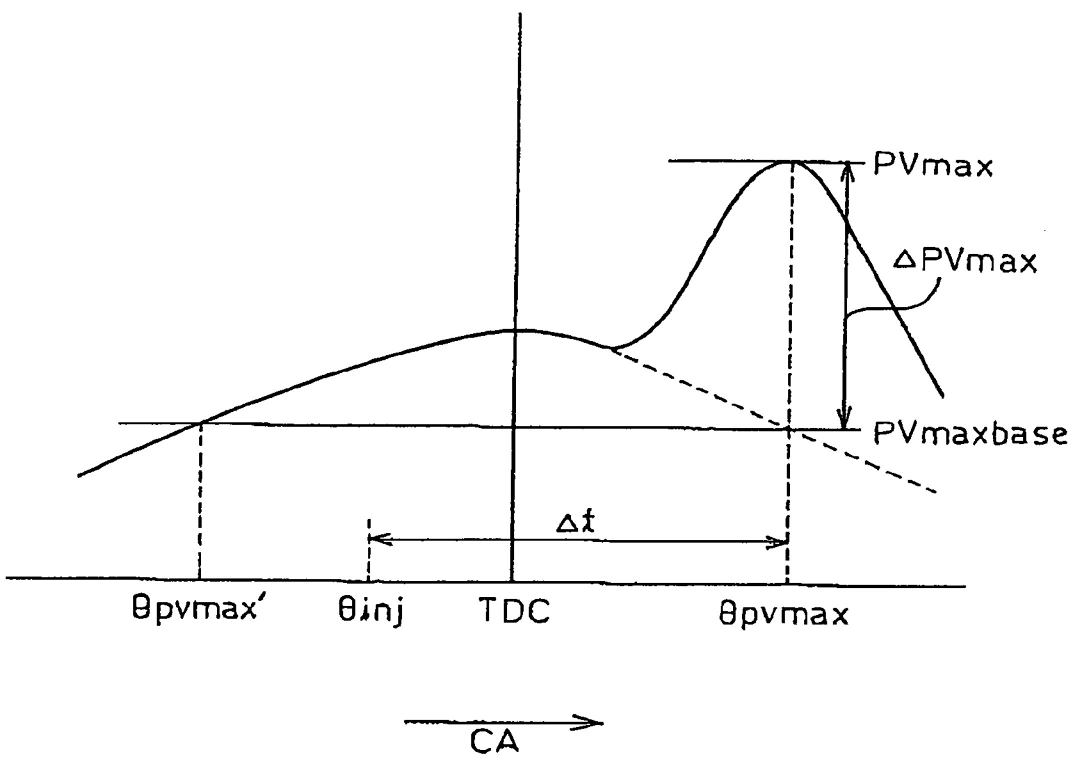
FIG. 17 is a view explaining the definitions of combustion parameters used in the present embodiment.

FIG. 17 shows the combustion parameters used in the present embodiment, that is, PVmax, θpvmax, θPVmax, and Δt.

In FIG. 17, the abscissa shows the crank angle (CA) from the compression stroke to expansion stroke of a cylinder, while the ordinate shows the above-mentioned PV value. On the abscissa, TDC shows the compression top dead center.

The PV value is the product of the pressure and volume, so becomes a value corresponding to the cylinder temperature due to the relationship PV=MRT of the equation of state of a gas (where M: number of moles of gas, R: general gas constant (J/mol·K), and T: temperature (°K)). Further, the timing when PV becomes the maximum value PVmax (FIG. 17, θpvmax) is confirmed by experiments to correspond to the point of time when the fuel injected into a cylinder finishes being burned (strictly speaking, the point of time when 90% of the fuel is burned). Therefore, θpvmax can be used as an indicator expressing the time of end of combustion in a cylinder.

In FIG. 17, θinj shows the fuel injection start timing from a fuel injector (10*a* to 10*d*, hereinafter referred to generally by the reference numeral 10). Further, in FIG. 17, Δt shows the combustion completion time defined as the time (crank angle) from the fuel injection start (θinj) to the combustion end (θpvmax). The fuel injected from a fuel injector 10 starts to burn after the elapse of a certain ignition delay time and finishes burning after the elapse of a combustion time determined by various conditions. Therefore, the combustion completion time Δt (=θpvmax−θinj) corresponds to the total of the ignition delay time and combustion time of the fuel.

Further, in FIG. 17, the broken line shows the change (PVbase) of the PV value when no combustion occurs in the cylinder. PVbase expresses the compression and expansion of gas in a cylinder due to the up and down motion of the piston, so becomes a curve symmetric about top dead center.

As explained above, ΔPVmax is defined as the difference between the maximum value PVmax of the PV value and the value PVmaxbase of PVbase at θpvmax.

The value PVmaxbase of PVbase at θpvmax can be easily calculated from the cylinder pressure at the end of the suction stroke and the cylinder volume at θpvmax. However, as explained above, the PVbase curve becomes symmetric about compression top dead center. Therefore, in the present embodiment, after detection of θpvmax, the value of PVbase at the point of the compression stroke becoming symmetric about top dead center (shown by θpvmax' in FIG. 17) is used to calculate ΔPVmax, but in practice the PV value and PVbase value become identical in the compression stroke where combustion occurs. For this reason, in the present embodiment, by actually using the PV value at θpvmax as the PV base value at θpvmax, the value of ΔPVmax is easily calculated.

Next, the meanings of the combustion parameters Δt, PVmax, θpvmax, and ΔPVmax will be explained.

As explained above, the period from the start of fuel injection to θpvmax, that is, the combustion completion time Δt, corresponds to the total of the ignition delay time and combustion time of the injected fuel. On the other hand, the ignition delay time and combustion time are both greatly affected by the EGR rate (ratio of amount of EGR gas in gas sucked into cylinder). As the EGR rate becomes larger, the Δt also increases. Therefore, the combustion completion time Δt has a close correlation with the cylinder EGR rate and can be used as an indicator expressing the EGR rate.

Further, the timing θpvmax where PVmax occurs is correlated with the end timing of the combustion and is greatly related to the combustion state in the cylinder. Further, if the other conditions are the same, the end timing of the combustion changes according to the fuel injection timing.

Further, the value of ΔPVmax is the difference (temperature difference) between the PV values at the time of combustion and the time when combustion does not occur, so is correlated with the amount of fuel burned in the combustion chamber, that is, the fuel injection amount.

The present embodiment takes note of the above and uses the Δt, θpvmax, and ΔPVmax for feedback control of the amount of EGR gas, fuel injection timing, and fuel injection amount to their optimum values.

That is, in the present embodiment, the engine is operated in advance while changing the engine operating conditions (accelerator opening degree and speed in combination) so as to search for the fuel injection amount, fuel injection timing, and EGR rate (EGR valve opening degree) giving the optimum combustion state in terms of the fuel efficiency, exhaust gas properties, etc. and these values are used as reference values for the fuel injection amount, fuel injection timing, and EGR valve opening degree at the different operating conditions and stored in the form of a two-dimensional numerical value map using the accelerator opening degree and speed (hereinafter referred to for convenience as the "reference injection condition map") in the ROM of the ECU 20.

Further, in the present embodiment, the values of the combustion parameters Δt, θpvmax, and ΔPVmax at the time of giving the optimum combustion state at the above different operating conditions are calculated and stored in the form of a two-dimensional numerical value map using the accelerator opening degree and speed (hereinafter referred to for convenience as a "target characteristic map") in the ROM of the ECU 20.

In actual operation, the ECU 20 first uses the above reference injection condition map to find the fuel injection amount, fuel injection timing, and EGR valve opening degree from the engine speed and accelerator opening degree and controls the fuel injection amount, fuel injection timing, and EGR valve opening degree to the reference injection condition map values.

Further, in this state, it calculates the combustion parameters Δt, θpvmax, and ΔPVmax of each cylinder based on the output from the cylinder pressure sensors 29*a* to 29*d*. Further, it uses the current accelerator opening degree and speed to find the target values Δt, θpvmax, and ΔPVmax of the combustion parameters at the optimum combustion state from the above-mentioned target characteristic map and adjusts the fuel injection amount, fuel injection timing, EGR valve opening degree, etc. determined from the reference injection condition map so that the actual combustion parameters match their target values.

Specifically, the ECU 20 adjusts the opening degree of the EGR valve 35 for feedback control so that the actual combustion parameter Δt becomes the target value and feedback controls the fuel injection timing and fuel injection amount so that the θpvmax and ΔPVmax match their target values.

Due to this, the EGR and fuel injection are controlled so that the actual combustion state becomes the optimum state.

Figure 18:
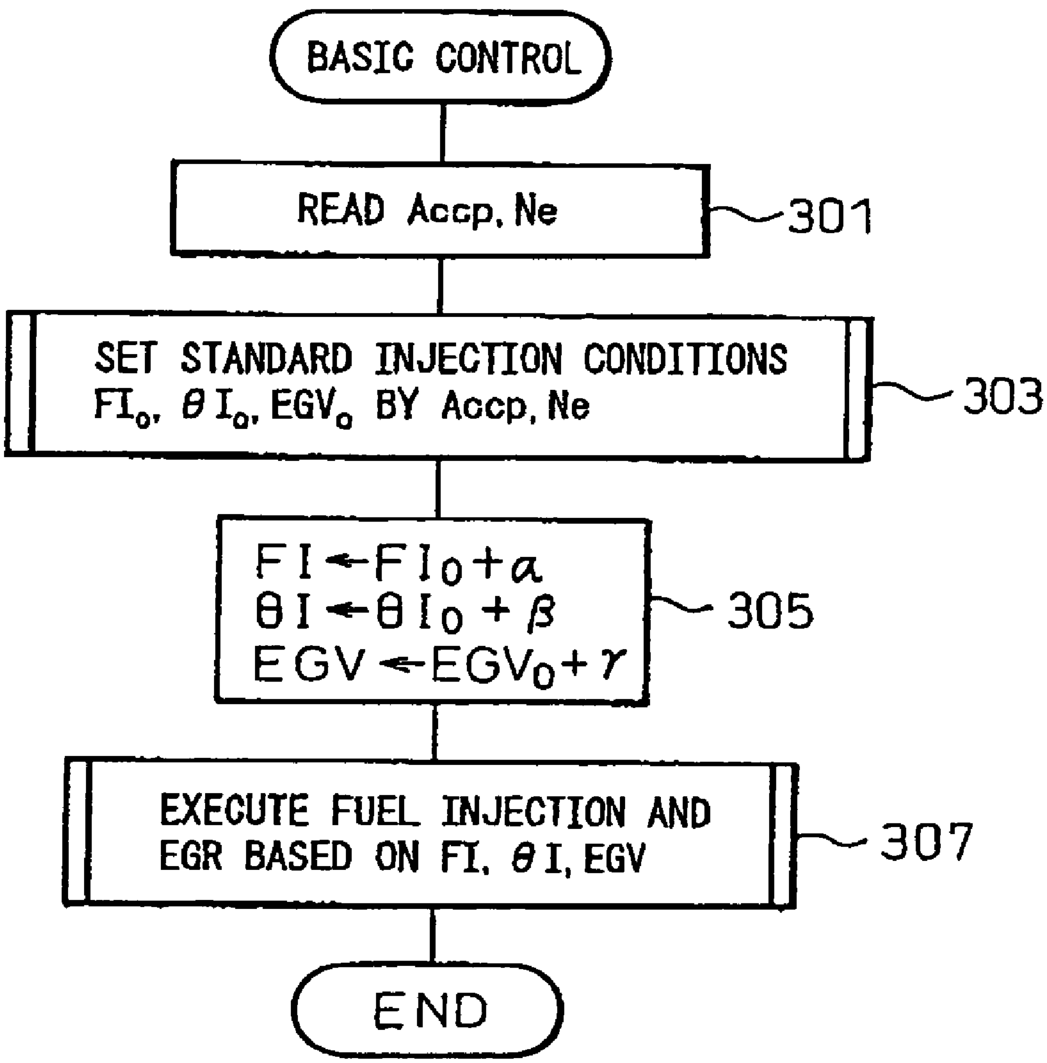
FIG. 18 is a flow chart explaining basic control of the fuel injection etc. in the present embodiment.
Figure 19:
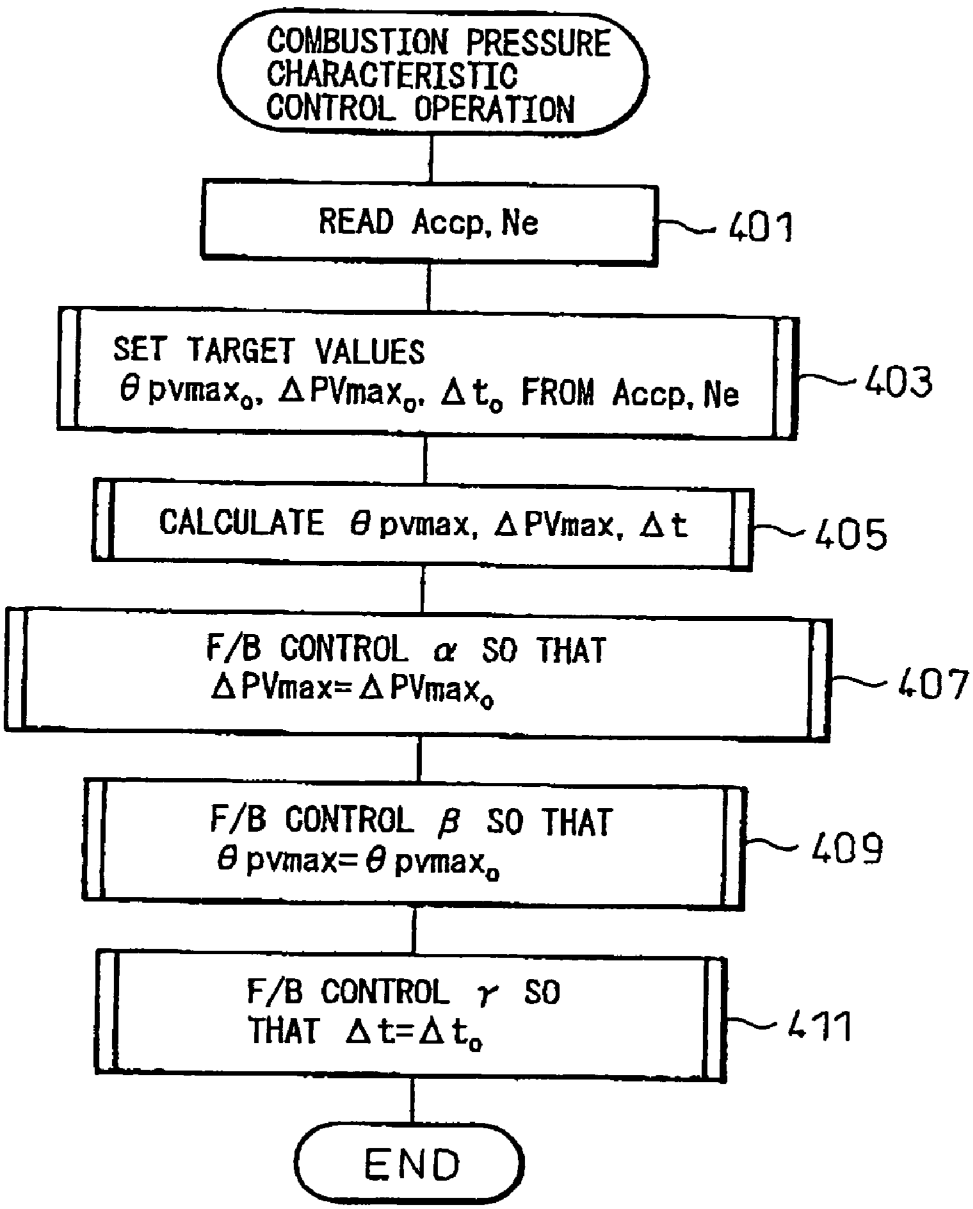
FIG. 19 is a flow chart explaining the control operation of fuel injection etc. using a combustion parameter in the present embodiment.

FIG. 18 and FIG. 19 are flow charts for specifically explaining the control operation based on the above combustion pressure characteristics (combustion parameter control operation). The operations of FIG. 18 and FIG. 19 are performed as routines executed by the ECU 20 every constant interval.

FIG. 18 shows the basic control operation of fuel injection and EGR. In the operation of FIG. 18, the ECU 20 sets the fuel injection amount, fuel injection timing, and EGR valve 35 opening degree as the sum of the reference values determined from the engine speed Ne and accelerator opening degree Accp and the correction amounts determined based on the combustion parameters from the operation of FIG. 19.

In FIG. 18, at step 301, the accelerator opening degree Accp and the engine speed Ne are read. At step 303, the values of Accp and Ne read at step 301 are used to read the reference fuel injection amount $FI_0$, reference fuel injection timing $\theta I_0$, and reference EGR valve opening degree $EGV_0$ from the above-mentioned reference injection condition map stored in the ROM of the ECU 20 in advance in the form a two-dimensional numerical value map using Accp and Ne.

The reference fuel injection amount, reference fuel injection timing, and reference EGR valve opening degree are the fuel injection amount, fuel injection timing, and EGR valve opening degree giving the optimum combustion state as found by actually operating the engine in advance.

The above reference values are the fuel injection amount and timing and EGR valve opening degree able to give the optimum combustion state in the environment at the time of experiments, but in actual operation, there are differences in fuel, differences in the engine operating environment (air temperature, atmospheric pressure, etc.), variations in equipment, changes in characteristics, etc., so even if operating using these reference values, the optimum combustion state is not necessarily obtained.

Therefore, in the present embodiment, the values of the reference values $FI_0$, $\theta I_0$, and $EGV_0$ found as explained above to which the correction amounts α, β, and γ are added for correction are set as the actual fuel injection amount, fuel injection timing, and EGR valve opening degree. That is, at step 305, the actual fuel injection amount FI, the fuel injection timing θI, and the EGR valve opening degree EGV are set as $FI=FI_0+\alpha$, $\theta I=\theta I_0+\beta$, and $EGV=EGV_0+\gamma$ and at step 307, the values set at step 305 are used for control of the fuel injection and EGR valve opening degree.

Here, α, β, and γ are feedback correction amounts set based on the combustion parameters by the operation of FIG. 19.

Explaining the operation of FIG. 19, first, at step 401, the accelerator opening degree Accp and the engine speed Ne are read. Further, at step 403, the target values $\theta pvmax_0$, $\Delta PVmax_0$, and $\Delta t_0$ of the θpvmax, ΔPVmax, and Δt are read from the two-dimensional map using Accp and Ne stored in the ROM of the ECU 20 in advance. The target values $\theta pvmax_0$, $\Delta PVmax_0$, and $\Delta At_0$ are the values of θpvmax, ΔPVmax, and Δt when the optimum combustion is obtained at those accelerator opening degree and speed.

Further, at step 405, the combustion parameters θpvmax, ΔPVmax, and Δt of the cylinders are calculated based on the outputs of the cylinder pressure sensors 29*a* to 29*d*.

Further, from steps 407 to 411, the correction amounts α, β, and γ are feedback corrected so that the values of the actual combustion parameters calculated at step 405 match with the target values found from the map at step 403.

That is, at step 407, first, the correction amount a of the fuel injection amount is feedback controlled so that the actual value of ΔPVmax matches with the target value $\Delta PVmax_0$, at step 409, the correction amount β of the fuel injection timing is feedback controlled so that the actual value of θpvmax matches with the target value $\theta pvmax_0$, and at step 411, the correction amount γ of the EGR valve opening degree is feedback controlled so that the actual value of Δt matches the target value $\Delta t_0$. The feedback control from step 407 to 411 is for example made PID control based on the deviation of the actual values from the target values.

For example, specifically explaining the PID control in the present embodiment using as an example the correction amount β of the fuel injection timing, if the deviation between the actual value of θpvmax and the target value $\theta pvmax_0$ isδ, the correction amount β is calculated using the following equation:

$$\beta=K_1\times\delta+K_2\times\Sigma\delta+K_3\times(\delta-\delta_{i-1})$$

where the first term $K_1\times\delta$ at the right side is a proportional term, the second term $K_2\times\Sigma\delta$ is an integration term, and Σδ expresses the cumulative value of the deviation δ (integrated value). Further, the third term $K_3\times(\delta-\delta_{1-1})$ is a derivative term, while $(\delta-\delta_{i-1})$ expresses the amount of change of the deviation δ from the previous time (derivative) (δi−1 is the value of δ of the previous time). Further, $K_1$, $K_2$, and $K_3$ are constants.

As explained above, by repeating the operations of FIG. 18 and FIG. 19, the actual fuel injection amount, fuel injection timing, and EGR valve opening degree (EGR rate) are controlled so that the combustion parameters match the target values.

By feedback control of the fuel injection amount, fuel injection timing, and EGR rate so that the combustion parameters match the target values in actual operation in this way, it is possible to easily obtain the optimum combustion state without individually considering for example the differences in the operating environment of the engine, changes in characteristics or variations in the equipment, differences in fuel, etc.

Note that in the operations of FIG. 18 and FIG. 19, by controlling the fuel injection amount and timing etc. to the reference values and feedback controlling the correction amounts for these references using combustion parameters, the fuel injection amount etc. are converged with the values giving the optimum combustion state in a short time. However, it is also possible to feedback control the fuel injection amount and timing and the EGR rate themselves using the combustion parameters without presetting reference values of the fuel injection amount etc.

Note that when controlling the fuel injection timing θI based on the deviation δ between the θpvmax and $\theta pvmax_0$ as in FIG. 18 and FIG. 19, in particular when the target value of the fuel injection timing itself is greatly advanced such as during operation in the above-mentioned low temperature combustion mode, the control may become dispersed.

For example, when the actual value of θpvmax is delayed from the target value $θpvmax_0$, the fuel injection timing θI is advanced to make the θpvmax faster. However, when the fuel injection timing is already set greatly advanced like in low temperature combustion, if overly advancing the fuel injection timing, the combustion becomes unstable and misfires easily occur, so if advancing the fuel injection timing, sometimes the θpvmax conversely will become slower.

In such a case, if using the θpvmax to control the fuel injection timing, the fuel injection timing will end up being further advanced and not only will the control become dispersed, but also the excessive advance of the fuel injection will cause fuel to be injected at a position where the piston has not sufficiently risen in the cylinder, the injected fuel will overflow from the inside to the outside of the bowl formed on the top of the piston or the injected fuel will directly strike the cylinder wall (bore flushing) and liquid fuel will deposit on the cylinder wall, so the problems will arise of dilution of the lubrication oil or deterioration of the fuel efficiency and exhaust properties.

In particular, when simultaneously using Δt to control the amount of EGR gas like at step 411 of FIG. 19, if the fuel injection timing is excessively advanced, the value of Δt will also become excessive and the amount of EGR gas will be greatly reduced, so the change of the fuel injection timing and the adjustment of the amount of EGR gas will affect each other and control will not longer be stable in some cases.

Therefore, in the present embodiment, an advance guard value θImax is provided for the fuel injection timing θI calculated at step 305 so that the fuel injection timing will not advance more than θImax.

Specifically, if the fuel injection timing θI is calculated as $θI=θI_0+β$ at step 305 of FIG. 18, the ECU 20 compares the calculated θI and the advance guard value θImax. When θI is set advanced by θImax or more (θI≧θImax), it uses the θImax instead of the calculated θI to execute the fuel injection control at step 307. That is, the value of θI calculated at step 305 is used at step 307 only when at the delayed side from the advance guard value θImax (θI≦θImax).

Due to this, excessive advance in feedback control of the fuel injection timing using the combustion parameter θpvmax is prevented, so dilution of the lubrication oil and deterioration of the fuel efficiency and exhaust properties due to bore flushing are prevented, dispersion of fuel injection timing control due to excessive advance and interference with feedback control of the amount of EGR gas using Δt are prevented, and the fuel injection timing or amount of EGR gas converge to their target values in a short time.

Note that the advance guard value θImax or the fuel injection timing is the timing by which the fuel injected from a fuel injector will not overflow to the outside from the inside of the bowl of the piston or deposit on the wall and is a value determined by the engine speed and the fuel injection pressure and other injection conditions. This value differs depending on various conditions such as the shape of the piston, the arrangement of the fuel injector, the engine speed, and the injection pressure, so it is desirable to prepare it as a numerical value map for each speed (fuel injection pressure) based on experiments using actual engines.

Next, another embodiment of the present invention will be explained.

In the present embodiment, the engine 1 operates switching between the two combustion modes of the normal diesel combustion mode, that is, the combustion mode injecting fuel at the end of the compression stroke and diffusing and burning it with a high air-fuel ratio, and the low temperature combustion mode that is, the combustion mode greatly advancing the fuel injection timing to form a premixed air-fuel mixture in the cylinder and greatly increasing the amount of EGR gas to burn the fuel with a low air-fuel ratio. In low temperature combustion, while combustion with a relatively low air-fuel ratio, a large amount of EGR gas is supplied to a combustion chamber so as to greatly suppress the generation of $NO_x$ and other harmful substances. Further, while a diesel engine, premix combustion may be performed so as to greatly reduce the amount of generation of soot.

However, in operation in the low temperature combustion mode, the combustion state changes extremely sensitively with respect to changes in the EGR rate. In some cases, the combustion state will greatly deteriorate with even just a small change of the EGR rate.

Therefore, in the present embodiment, when the engine is operated in the low temperature combustion mode, the EGR rate (EGR valve opening degree) is feedback controlled based on a combustion parameter.

Figure 20:
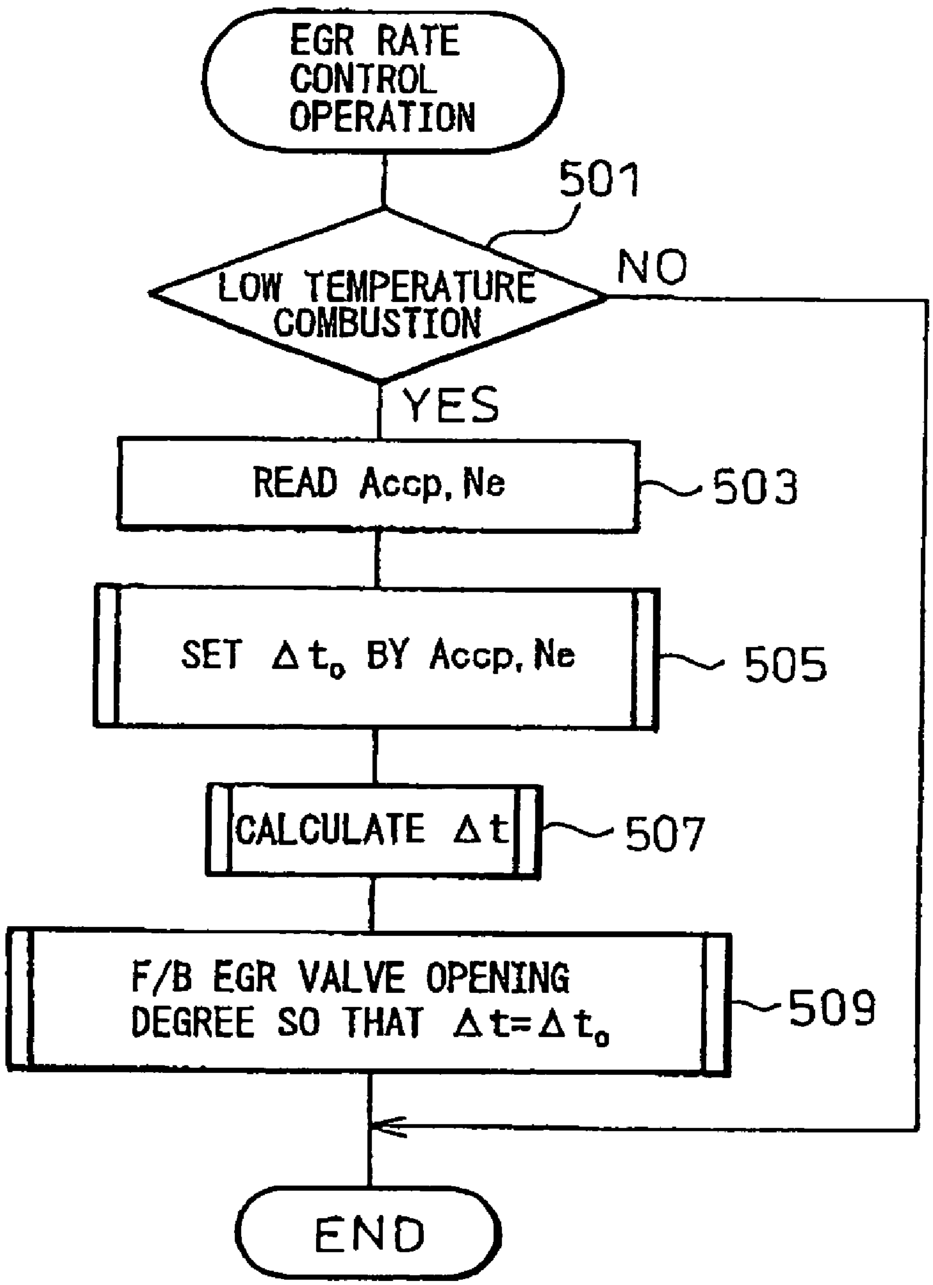
FIG. 20 is a flow chart explaining another embodiment of EGR rate control using a combustion parameter.

FIG. 20 is a flow chart for explaining the EGR rate control operation using a combustion parameter of the present embodiment.

In the operation of FIG. 20, first, at step 501, it is judged if the engine is currently being operated in the low temperature combustion mode. When not being operated in the low temperature combustion mode, the operation is ended immediately without executing step 503 on. In this case, for example, the EGR rate is controlled by open loop control based on the accelerator opening degree and the engine speed in the same way as the past.

When the engine is currently being operated in the low temperature combustion mode at step 501, the routine next proceeds to step 503, where the current accelerator opening degree Accp and the engine speed Ne are read from the corresponding sensors. At step 505, the target value $Δt_0$ of Δt at the current Accp and Ne is read from the target value map of the combustion completion time Δt stored in advance in the ROM of the ECU 20 in the form of a two-dimensional numerical value map of Accp and Ne.

Here, $Δt_0$ is the combustion completion time when supplying EGR gate by an EGR rate giving the optimum combustion state in the low temperature combustion mode.

Next, at step 507, the current actual combustion completion time Δt is calculated based on the outputs of the cylinder pressure sensors 29*a* to 29*d*. Further, at step 509, the EGR valve opening degree is feedback controlled so that the actual combustion completion time Δt matches with the target value $Δt_0$. This feedback control, like the case of FIG. 19, is for example made PID control based on the deviation between the target value $Δt_0$ and actual value Δt.

Note that in the present embodiment, the fuel injection amount and fuel injection timing are set to optimum values for operation in the low temperature combustion mode in advance by a routine executed separately by the ECU 20.

As shown in FIG. 20, in particular at the time of operation in the low temperature combustion mode sensitive to change of the EGR rate, it is possible to control the EGR rate of the engine based on the combustion parameter Δt so as to obtain a stable, optimum combustion state even at the time of low temperature combustion. However, as explained above, control based on Δt enables the optimum EGR rate to be obtained after transition to the low temperature combustion mode, but when shifting from the normal combustion mode to the low temperature combustion mode, if using feedback control based on Δt to adjust the amount of EGR gas, sometimes a relatively long time will be taken until convergence to the EGR rate of after transition to the low temperature combustion mode.

As explained above, in the low temperature combustion mode, the fuel injection timing is greatly advanced compared with the normal combustion mode. However, at the time of transition to the low temperature combustion mode, if advancing the fuel injection timing all at once, the rapid change in the combustion state will cause the engine output torque to fluctuate and cause so-called “torque shock” to occur. Therefore, when shifting from the normal combustion mode to the low temperature combustion mode, a certain transition period is provided and during this transition period (time) the fuel injection timing is relatively gently continuously changed from the value in the normal combustion mode to the target value in the low temperature combustion mode, i.e., transitional processing is performed.

Therefore, during the transitional processing, the fuel injection timing used for calculation of Δt (FIG. 17, θinj) is made to gradually change (advanced) and in accordance with this, the timing where PVmax (FIG. 17, θpvmax) occurs is also gradually changed (advanced), so at the start of the switch, the value of Δt will not change that much from the value before the switch and will be a relatively small value.

Therefore, the difference between the target value $\Delta t_0$ of Δt after switching to the low temperature combustion mode and the actual Δt also will not become that much greater compared with before the switch. The change in the opening degree of the EGR value will also become relatively small. That is, the opening degree of the EGR valve will gradually change along with the advance of the fuel injection timing. The change in the actual amount of the EGR gas becomes slower than the change of the EGR valve opening degree, so at the time of switching, if the change of the opening degree of the EGR valve is small, the change in the actual amount of EGR gas will end up becoming considerably gentle.

On the other hand, in the low temperature combustion mode, the amount of EGR gas has to be greatly increased compared with the normal combustion mode, but as explained above, if gradually changing the opening degree of the EGR valve in accordance with the actual Δt during the transition period, due to the delay in the change of the amount of the EGR gas, the EGR rate will not reach the target value of the low temperature combustion mode even at the time of completion of the transition to the low temperature combustion mode (when fuel injection timing reaches target value), i.e., time will be taken for convergence to the target value.

Therefore, in the present embodiment, when calculating the Δt during the transition period, the actual fuel injection timing is not used. The target fuel injection timing after the completion of transition to the low temperature combustion is used. Due to this, at the time of start of the transition period, the value of Δt becomes much larger than the case of use of the actual fuel injection timing. The deviation with the Δt target value after completion of transition also becomes large. In the present embodiment, the EGR valve opening degree is feedback controlled based on the deviation between the Δt and the Δt target value, so the EGR valve opening degree also greatly changes.

Figure 21:
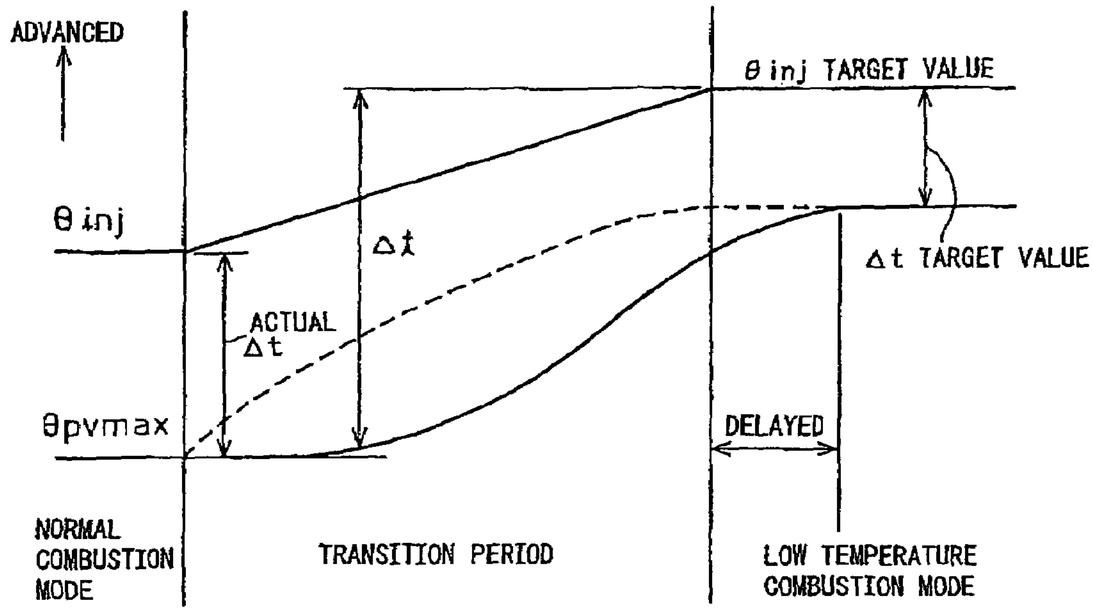
FIG. 21 is a timing chart explaining control for switching from a normal combustion mode to a low temperature combustion mode.

FIG. 21 is a view for explaining the change in Δt in the transition period when switching from the normal combustion mode to the low temperature combustion mode in the present embodiment.

In FIG. 21, the curve θinj shows the change in the fuel injection timing, while the curve θpvmax shows the change in the timing where the PVmax occurs. The actual Δt becomes equal to the distance between the two curves (see FIG. 21).

In FIG. 21, when the transition period of switching from the normal combustion mode is started, the fuel injection timing θinj is continuously advanced and becomes the target fuel injection timing in the low temperature combustion mode when the transition period ends.

In this case, as shown in FIG. 21, the θinj will not greatly change even at the start of transition, so the Δt using the actual fuel injection timing (actual Δt) will not become that large a value from the start of the transition period and the opening degree of the EGR valve will also not greatly change. For this reason, the change in the amount of the EGR gas becomes considerably gentle and the change of the θpvmax also becomes gentle as shown by the solid line in FIG. 21. For this reason, the value of θpvmax will not reach the target value at the low temperature combustion even when the switching of the fuel injection timing is completed and therefore a delay time will occur as shown in FIG. 21 until the θpvmax reaches the target value (that is, until the EGR rate reaches the target value).

As opposed to this, Δt calculated using the fuel injection timing target value after switching to the low temperature combustion mode instead of the actual fuel injection timing, as shown in FIG. 21, becomes a value larger than the actual Δt. Therefore, in the present embodiment, the EGR value opening degree also greatly changes and the speed of change (increase) of the amount of EGR gas also becomes faster, so θpvmax changes as shown by the broken line in FIG. 21 and the occurrence of a delay time as in the case of use of the actual Δt can be prevented.

Due to this, in the present embodiment, when switching from the normal combustion mode to the low temperature combustion mode, it becomes possible to make the EGR rate converge to the target value in a short time.

Next, control at the time of switching from the low temperature combustion mode to the normal combustion mode opposite to the above will be explained using FIG. 22.

For example, consider the case of controlling the fuel injection amount, fuel injection timing, EGR rate, etc. using combustion parameters only during low temperature combustion mode operation and performing the conventional open loop control at the time of the normal combustion mode.

In this case, at the time of low temperature combustion mode operation, the fuel injection amount, fuel injection timing, amount of EGR gas, etc. are feedback controlled based on the combustion parameters (Δt, θpvmax, ΔPVmax, etc.) and the actual fuel injection amount, fuel injection timing, amount of EGR gas, etc. include feedback correction amounts.

For example, explaining this taking as an example the fuel injection timing, as explained at step 305 of FIG. 18, the actual fuel injection timing during low temperature combustion becomes the target value $\theta I_0$ to which the feedback correction amount β is added.

Figure 22:
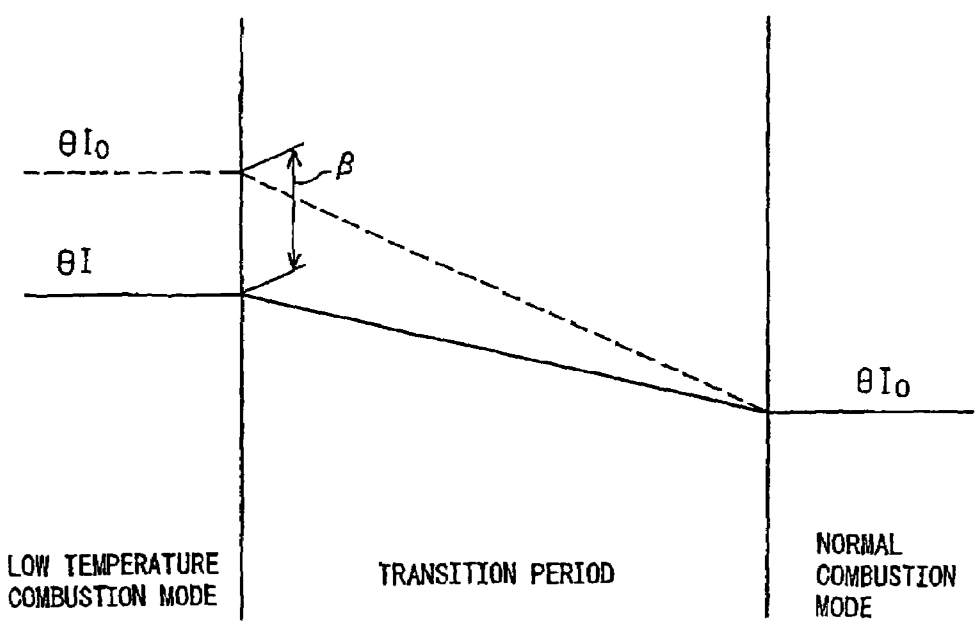
FIG. 22 is a timing chart explaining control fox switching at the time of reset from the low temperature combustion mode to the normal combustion mode.

Normally, as shown in FIG. 22, even when switching from the low temperature combustion mode to the normal combustion mode, a transition period similar to that explained in FIG. 21 is provided. The target value of the fuel injection timing is made to change continuously in a transition period from that of the time of the low temperature combustion mode to the target value at the time of the normal combustion mode.

However, as explained above, the actual fuel injection timing in the low temperature combustion mode includes the feedback correction amount β. The fuel injection timing in the normal combustion mode is the target fuel injection timing (open loop control) not including a feedback correction amount β. For this reason, at what point of time to stop the feedback control and make the feedback correction amount β zero becomes an issue. For example, if stopping the feedback control immediately along with the start of the transition period, the fuel injection timing would rapidly change by the feedback correction amount β simultaneously with the start of the transition period and torque fluctuation might occur due to the rapid change in the fuel injection timing. The same applies in the case of continuing the feedback control during the transition period and stopping the feedback control along with the completion of transition.

Therefore, in the present embodiment, as shown in FIG. 22, while the feedback control is stopped at the same time as the start of the transition period, the feedback correction amount β at the time of start of the transition period is not immediately made 0, but the feedback correction is made to be gradually reduced continuously so that it becomes 0 at the time of the end of the transition period.

In FIG. 22, the broken line shows the target value $\theta I_0$ of the fuel injection timing, while the solid line shows the actual fuel injection timing θI. As shown in the figure, in the low temperature combustion mode operation, feedback control is performed based on the combustion parameter θpvmax. A difference of exactly the feedback correction amount β occurs between the target $\theta I_0$ and actual fuel injection timing θI.

When the transition period is started, in the present embodiment, the feedback control is immediately stopped, but at the start of transition, the actual fuel injection timing θI is maintained as is as the value including the feedback correction amount β at the time of start of the transition period. Therefore, in the present embodiment, sudden change of the fuel injection timing due to the stop of the feedback control at the time of start of the transition period is prevented.

Further, as shown in FIG. 22, during the transition period, the value of β is continuously reduced so as to become 0 at the end of the transition period (for example, the value of β is reduced proportionally to the elapsed time after the start of the transition period). Due to this, during the transition period, the actual fuel injection timing θI gradually approaches the target fuel injection timing $\theta I_0$ and matches $\theta I_0$ at the time of the end of the transition period. Due to this, in the present embodiment, it becomes possible to shift from the feedback control of the fuel injection timing during the low temperature combustion mode to open loop control in the normal combustion mode without any torque fluctuation.

Note that FIG. 22 was explained using as an example the fuel injection timing, but needless to say the fuel injection amount or amount of EGR gas may be similarly transitionally controlled.

Next, another example of application of EGR control using a combustion parameter will be explained. In the above embodiments, the combustion parameter Δt was used to accurately control the EGR rate and enable the optimum EGR rate to be obtained for combustion even at the time of low temperature combustion.

For example, when purifying exhaust by providing a known $NO_x$ storing/reducing catalyst which stores $NO_x$ in the exhaust by absorption, adsorption, or both when the air-fuel ratio of the exhaust flowing into the engine exhaust passage is lean and reduces and purifies the stored $NO_x$ using the CO and other reduction ingredients or hydrocarbons etc. in the exhaust when the air-fuel ratio of the inflowing exhaust becomes rich, a need arises to accurately control the exhaust air-fuel ratio (engine air-fuel ratio) at the time of reducing and purifying the $NO_x$ stored in the $NO_x$ storing reducing catalyst. However, with the above control, while it is possible to obtain the optimal EGR rate with a good response, it is not always possible to accurately control the combustion air-fuel ratio (exhaust air-fuel ratio) of the engine.

For example, when the injection characteristics of a fuel injector change due to wear of the internal mechanism etc. or when there is variation of the injection characteristics in each product, even if controlling the combustion parameter to the target value, the target air-fuel ratio is not necessarily obtained.

On the other hand, to control the exhaust air-fuel ratio to the target air-fuel ratio, it is also possible to arrange an air-fuel ratio sensor in the exhaust passage to directly measure the exhaust air-fuel ratio and thereby feedback control the EGR control valve.

However, EGR control using an air-fuel ratio sensor cannot necessarily control the amount of EGR gas with a good precision when there is a delay in gas transport to the mounting position of the exhaust gas sensor or there is a delay in response in the sensor itself.

Therefore, in the present embodiment, by further combining feedback learning control based on the air-fuel ratio sensor output with the EGR feedback control using a combustion parameter, it is possible to control the amount of EGR gas with a good response including in transitional operation and control the exhaust air-fuel ratio with a good precision.

That is, in the present embodiment, when a predetermined learning control condition (for example, the engine being operated in a steady state) is satisfied in the state where the feedback control of FIG. 20 enables the Δt to be controlled to match with the target value $\Delta t_0$, the value of the combustion completion period target value $\Delta t_0$ is changed a little at a time so that the exhaust air-fuel detected by the air-fuel ratio sensor arranged in the exhaust passage matches with the target air-fuel ratio determined from the accelerator opening degree Accp and the engine speed Ne.

For example, when the actual exhaust air-fuel ratio is at the rich side from the target air-fuel ratio, the target value $\Delta t_0$ is made to be decreased by exactly the predetermined amount gt, while when it is at the lean side from the target air-fuel ratio, the target value $\Delta t_0$ is made to be increased by exactly the predetermined amount gt.

Further, the adjusted target value $\Delta t_0$ is used for control of the amount of the EGR gas based on the Δt again so as to adjust the amount of EGR gas so that the actual Δt matches the adjusted target value $\Delta t_0$. When the actual Δt and the corrected target value $\Delta t_0$ match, it is again judged if the exhaust air-fuel ratio detected by the air-fuel ratio sensor and the target air-fuel ratio match. When they do not match, the target value $\Delta t_0$ is again increased or decreased by exactly the predetermined value gt and the above operation is repeated.

Further, an operation is performed to store the target value $\Delta t_0$ when both of the exhaust air-fuel ratio and Δt match the target values as the new target value (learning value) at that accelerator opening degree Accp and engine speed Ne. By learning correction of the combustion parameter $\Delta t_0$ based on the actual air-fuel ratio output in this way, it becomes possible to accurately control the exhaust air-fuel ratio while controlling the EGR rate with a good response.

Next, another embodiment of the present invention will be explained.

In the embodiments explained above, the PV value was calculated and the Δt found based on PVmax as a combustion parameter was used to control the amount of EGR gas. However, as a combustion parameter suitable for control of the amount of EGR gas, it is possible to similarly use, in addition to PVmax or Δt, any value having a close correlation to one or both of the ignition delay period and combustion period.

For example, the present embodiment uses as combustion parameters having close correlation with the ignition delay period and the combustion period the time Δtd until the value of $PV^{\kappa}$ becomes the minimum value $PV^{\kappa}min$ and the time Δtc from when the value of $PV^{\kappa}$ becomes the minimum value $PV^{\kappa}min$ to when it becomes the maximum value $PV^{\kappa}max$.

Here, $PV^{\kappa}$ is the product of the combustion chamber pressure P at each crank angle and the combustion chamber volume V at that crank angle to the κ power. Further, κ is the specific heat ratio of the air-fuel mixture.

Here, from the equation of state of a gas, in adiabatic change, $PV^{78}$ becomes constant, but in an actual cylinder compression stroke, heat is radiated through the cylinder wall or through the piston, so in the cylinder compression stroke, $PV^{78}$ gradually decreases from the start of compression.

On the other hand, if the air-fuel mixture is ignited and combustion starts, heat of combustion is generated, so the value of $PV^{78}$ starts to increase. For this reason, the point where the value of $PV^{\kappa}$ changes from a decrease to increase, that is, the point where $PV^{\kappa}$ becomes the minimum value $PV^{\kappa}min$, is the starting point of combustion. Further, similarly, during combustion, the value of $PV^{\kappa}$ continues to increase, but when the combustion is completed and heat is no longer generated, the value of $PV^{\kappa}$ again starts to decrease. Therefore, the point where the value of $PV^{78}$ changes from an increase to decrease, that is, the point where $PV^{78}$ becomes the maximum value $PV^{\kappa}max$, is the end point of combustion.

If designating the fuel injection start timing as θinj and the crank angle where the $PV^{78}$ becomes the minimum value $PV^{\kappa}min$ as θstart, Δtd=θstart−θinj is the period from the start of fuel injection to the start of combustion, so becomes equal to the ignition delay period.

Further, if making the crank angle where the $PV^{\kappa}$ becomes the maximum value $PV^{\kappa}max$ θend, Δtc=θend−θstart becomes equal to the period from when the combustion is started to when it ends, that is, the combustion period.

As explained above, the ignition delay period and the combustion period are both closely correlated with the EGR rate. If the EGR rate increases, both the ignition delay period and the combustion period increase, while if the EGR rate falls, they both decrease.

Therefore, in the present embodiment, either of the ignition delay period Δtd or the combustion period Δtc is used to control the EGR rate by a method similar to the case of using the above-mentioned Δt.

That is, in the present embodiment, the value of the ignition delay period (or combustion period) at the combustion state giving the optimal EGR rate in advance is set in advance as the target value $\Delta td_0$ (or $\Delta tc_0$) for each accelerator opening degree Accp and engine speed Ne. Further, in actual operation, the $PV^{78}$ is calculated from the combustion chamber pressure and crank angle for every stroke cycle and the crank angle where the value of this $PV^{\kappa}$ becomes the minimum value (or the minimum value and maximum value) is detected to calculate the Δtd (or Δtc) at actual operation.

Further, the EGR control valve opening degree is feedback controlled based on the deviation between the Δtd (or Δtc) and the target value $\Delta td_0$ (or $\Delta tc_0$) at the current operating conditions (Accp, Ne).

Note that the specific heat ratio κ can be approximated as a constant value and the combustion chamber volume V becomes a function of the crank angle and can be calculated in advance. Therefore, when calculating $PV^{\kappa}$, by calculating the value of $V^{\kappa}$ for each crank angle in advance and storing it in the ROM of the ECU 20 in the form of a numerical value table, it is possible to easily calculate the value of $PV^{\kappa}$.

Due to this, in the same way as the feedback control using Δt, it is possible to control the EGR rate accurately with a good response without increasing the processing load of the control circuit.

That is, in the present embodiment, by calculating a combustion parameter corresponding to the combustion timing including at least one of the ignition delay period or combustion period based on the combustion chamber pressure detected by the cylinder pressure sensors and controlling the EGR rate so that the combustion parameter becomes a predetermined target value, it is possible to control the EGR rate accurately with a good response.

Note that when performing pilot injection injecting a small amount of fuel and burning it in the combustion chamber before the main fuel injection so as to secure good temperature and pressure conditions for burning the main fuel injection fuel, if starting the judgment as to whether the calculated value of the $PV^{\kappa}$ is the minimum $PV^{\kappa}min$ after the start of the main fuel injection, erroneous detection of the point of time of start of combustion of the pilot fuel injection fuel as the point of start of injection of the main fuel injection fuel is prevented.

Next, another embodiment of the present invention will be explained.

In the present embodiment, the control of the fuel injection and injection timing in the case of multi-fuel injection will be explained in detail.

As explained above, multi-fuel injection includes pilot injection performed before the main fuel injection and after injection etc. performed after the main fuel injection, but both the pilot injection and after injection may be further divided based on their injection timings.

Figure 23:
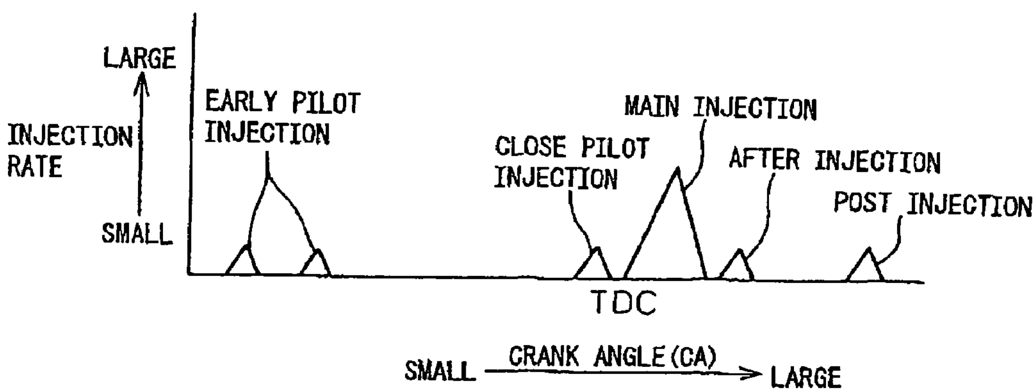
FIG. 23 is a view explaining the different fuel injections forming multi-fuel injection.

FIG. 23 is a view explaining the different fuel injections forming the multi-fuel injection in the present embodiment.

In FIG. 23, the abscissa shows the crank angle (CA), while the TDC on the ordinate indicates compression top dead center. Further, the ordinate of FIG. 23 shows the injection rates of the different fuel injections. The areas of the peaks show the relative fuel injection amounts of the fuel injections. As shown in the figure, with multi-fuel injection, all or part of early pilot injection, close pilot injection, main injection (main fuel injection), after injection, and post injection are performed.

Below, the fuel injections other than main injection will be simply explained.

(1) Early Pilot Injection

Early pilot injection is pilot injection performed at a timing considerably earlier than the main injection (for example, a timing earlier by at least 20 degrees in crank angle (20° CA) than the start of main injection). The fuel injected in the early pilot injection forms a premixed air-fuel mixture and ignites by compression, so does not generate much $NO_x$ or particulate at all. By performing early pilot injection, it is possible to improve the exhaust properties. Further, early pilot injection raises the temperature and pressure in a combustion chamber and shortens the ignition delay period of the later explained close pilot injection or main injection, so can suppress the noise of combustion or generation of $NO_x$ due to the main injection.

Early pilot injection is performed at a point of time when the temperature and pressure inside the combustion chamber are relatively low, so when the injection amount is large, the injected fuel reaches the cylinder wall as a liquid and causes the problem of dilution of the lubrication oil etc. Therefore, when the injection amount is large, the early pilot injection is performed a plurality of times dividing the amount of injection required into small amounts so as to prevent liquid fuel from reaching the cylinder wall.

(2) Close Pilot Injection

Close pilot injection is pilot injection performed right before the main injection (for example, within 20° CA from the start of the main injection). Close pilot injection features less generation of hydrocarbons compared with early pilot injection and like early pilot injection shortens the ignition delay period of the main period so can suppress the noise and generation of $NO_x$ of the main injection.

(3) After Injection

After injection is injection started right after the end of main injection or at a relative short interval from it (for example, within 15° CA after the end of main injection).

After injection is designed to increase the temperature, pressure, turbulence, etc. in the combustion chamber again at the end of combustion of the fuel of the main injection so as to improve the combustion and to reduce the injection amount of the main injection.

That is, at the end of combustion of the main injection, the temperature and pressure in the combustion chamber drop and the turbulence in the cylinder becomes smaller as well, so the fuel becomes harder to burn. By performing after injection in this state, an increase in turbulence due to injection of fuel and an increase in the temperature and fuel due to combustion of the injected fuel occur, so the atmosphere inside the combustion chamber is improved in a direction promoting combustion. Further, it is possible to reduce the injection amount of the main injection by exactly the injection amount of the after injection, so the generation of a local excessively region of concentration due to the main injection fuel is suppressed and the drop in the main injection amount causes the cylinder maximum temperature due to combustion to fall and thereby suppresses the generation of $NO_x$.

(4) Post Injection

Post injection is fuel injection started after a relative interval after the end of the main injection (for example, at least 15° CA after the end of the main injection). The main purpose of the post injection is to raise the exhaust temperature and pressure.

For example, when the temperature of the exhaust purification catalyst arranged in the exhaust system is low and the activation temperature is not reached, so the exhaust gas purification action is not obtained, performing post injection enables the exhaust temperature to be raised and the catalyst temperature to be raised to the activation temperature in a short time. Further, by performing the post injection, the temperature and pressure of the exhaust rise, so in an engine having a turbocharger, it is possible to obtain the effects of an improvement in the acceleration performance due to the increase in the work of the turbine and the rise in the supercharging pressure and suppression of smoke at the time of acceleration.

Further, when using as the exhaust purification catalyst a selective reduction catalyst purifying the $NO_x$ from exhaust using hydrocarbon ingredients, performing post injection enables hydrocarbons to be supplied to the catalyst and the purification rate of the $NO_x$ to be improved.

As explained above, by performing multi-fuel injection, it is possible to greatly improve the exhaust properties and noise of a diesel engine, but obtaining this improvement effect requires precise control of the injection amount and injection timing of each fuel injection in the multi-fuel injection. For example, in the close pilot injection, where the greatest precision is required for the injection amount and injection timing, it is necessary to control a single fuel injection injection amount to about 1.5 to 2.5 $mm^3$ and the injection timing to about ±2° CA or less.

However, as explained above, fuel injectors feature variations between individual injectors due to tolerance, changes in fuel injection characteristics due to period of use, etc., so with normal open loop control, it is not possible to improve the precision of the fuel injection and the effect of the multi-fuel injection cannot be sufficiently obtained.

Further, even if controlling the fuel injection based on the combustion noise like the system of Japanese Unexamined Patent Publication (Kokai) No. 2001-123871 explained above, while the injection amount of the pilot injection can be controlled, it is not possible to separately control the injection amounts of the different fuel injections. Further, there is the problem that the injection timing cannot be controlled at all.

In the present embodiment, it is made possible to separately accurately control the injection among, injection timing, injection pressure, etc. of each fuel injection using the parameters $PV^{\gamma}$ and PV calculated using the combustion chamber pressure P detected using the cylinder pressure sensors 29*a* to 29*d* (hereinafter referred to all together as the "cylinder pressure sensors 29") and the combustion chamber volume V at that time.

Figure 24A:
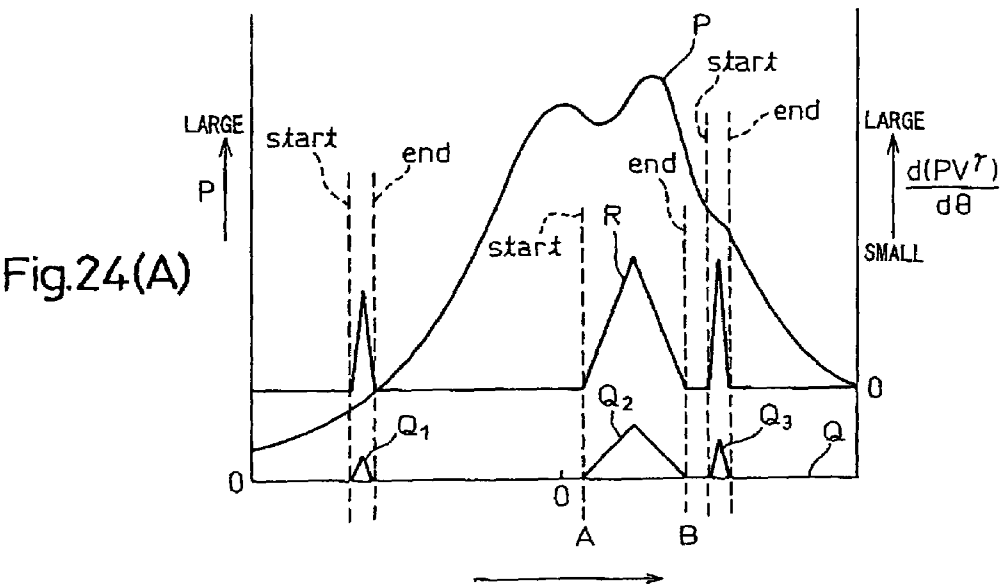
FIG. 24(A) is a view explaining the principle of detection of the combustion period in an embodiment.

FIG. 24(A) is a view for explaining the principle of detection of the combustion timing in the present embodiment. FIG. 24(A) shows the change in the various parameters relating to the combustion in the combustion chamber from the end of the compression stroke of a cylinder to the start of the expansion stroke with respect to the crank angle θ (crank angle θ=0 indicates compression top dead center). In FIG. 24(A), the curve P shows the change in the actual combustion chamber pressure detected by the cylinder pressure sensors 29. Further, the curve Q shows the heat release rate in a cylinder. As will be understood from curve Q, in the present embodiment, in addition to the main injection, multi-fuel injection including early pilot injection and after injection is performed. The peaks Q1, Q2, and Q3 of the heat release rate of FIG. 24(A) correspond to the early pilot injection, main injection, and after injection.

As will be understood from the curve P of FIG. 24(A), it is possible to judge the combustion period of each fuel injection at the multi-fuel injection from the heat release rates Q1, Q2, and Q3, but the combustion periods of the fuel injections do not clearly appear in the change of combustion chamber pressure, so the fuel injections cannot be judged from the curve P.

On the other hand, if calculating the heat release rates, it is possible in a sense to judge the combustion period of each fuel injection as shown by FIG. 24(A). Further, the heat release rate dQ itself can be calculated from the following equation based on the combustion chamber pressure:

$$dQ/d\theta=(\kappa\cdot P\cdot(dV/d\theta)+V(dP/d\theta))/(\kappa-1)$$

(where θ shows the crank angle and κ shows the specific heat ratio of the cylinder air-fuel mixture)

However, calculation of the heat release rate is complicated. Further, it includes many terms including the crank angle θ, so is susceptible to error of the relatively low detection accuracy crank angle. For this reason, use of the heat release rate as a control indicator for actual control has problems of the increase in calculation load and error and is not practical.

Therefore, in the present embodiment, the heat release rate is not used for detection of the combustion period. The primary rate of change (first derivative) of the value $PV^{\gamma}$ obtained by multiplying the pressure P detected by the cylinder pressure sensor 29 and the γ power of the volume V at that time (hereinafter referred to as the "$PV^{\gamma}$ derivative") is used. Here, γ is a polytrope exponent.

The polytrope exponent γ may be found in advance by experiments etc. Further, V becomes a function of only θ, so it is also possible to calculate $V^{\gamma}$ in advance for the value of each θ. Therefore, the $PV^{\gamma}$ value can be calculated by simple calculation at each crank angle and the rate of change with respect to θ, that is, the $PV^{\gamma}$ derivative, can be found by simple calculation of the difference as explained later.

The curve R of FIG. 24(A) shows the $PV^{\gamma}$ derivative calculated at each crank angle. The $PV^{\gamma}$ derivative becomes similar in-form to the heat release rate pattern, so as shown by the curve R, the value of the $Pv^{\gamma}$ derivative becomes mostly zero and becomes a positive value only in the part corresponding to the combustion period, so it is possible to judge the combustion period of each fuel injection extremely clearly.

If approximating the compression due to movement of the piston in the cylinder by the polytrope change of the exponent γ, the pressure P and combustion chamber volume V have the relationship of $PV^{\gamma}=C$ (constant value). That is, with polytrope change where no combustion occurs and no energy is given to the gas in the cylinder other than the work due to the compression, the $PV^{\gamma}$ value becomes constant at all times. For this reason, when no combustion occurs in a combustion chamber, the value of the first derivative $d(PV^{\gamma})/d\theta$ of the $PV^{\gamma}$ value by the crank angle becomes zero (in actuality, heat is radiated from the cylinder wall, so the value of the first derivative $d(PV^{\gamma})/d\theta$ becomes negative when no combustion occurs).

On the other hand, if combustion occurs in a cylinder, the gas in the cylinder is given energy (heat) in addition to the work by the compression, so the change in the gas in the cylinder no longer is a polytrope change. The $PV^{\gamma}$ value continues increasing while the combustion is occurring, so the $PV^{\gamma}$ derivative becomes a positive value.

Therefore, the period during which combustion occurs in a combustion chamber can be clearly judged as the period during which the $PV^{\gamma}$ derivative becomes positive. The same is true, as shown by the curve R of FIG. 24(A), when a plurality of fuel injections (combustions) Q1, Q2, and Q3 are performed in one stroke cycle of the cylinder.

The present embodiment calculates the PV1 derivative based on the combustion chamber pressure for each cylinder detected by the cylinder pressure sensor 29 during engine operation and judges the period during which this $PV^{\gamma}$ derivative is a positive value as the combustion period. The "start" at the curve R in FIG. 24(A) shows the combustion start timing, the "end" shows the combustion end timing, and the interval between the "start" and "end" shows the combustion period.

Note that the start timing (crank angle) of the combustion period is strongly correlated with the fuel injection timing. Further, the length of the combustion period (length from combustion start timing to end timing) is strongly correlated with the fuel injection period. Further, the fuel injection period changes due to the injection rate if the fuel injection amount is constant, while the injection rate changes due to the fuel injection pressure.

In the present embodiment, the amount of heat release and combustion period of each fuel injection giving the optimum combustion state for each set of engine operating conditions (for example, the combination of the engine speed and accelerator opening degree and the type of the multi-fuel injection) are found in advance by experiments etc. and these optimum values are stored in the ROM of the ECU 20 as a numerical value table using the engine speed and accelerator opening degree for each fuel injection of the multi-fuel injection (early pilot injection, close pilot injection, main injection, after injection, post injection).

The ECU 20 calculates the $PV^{\gamma}$ derivative at each crank angle based on the combustion chamber pressure of each cylinder detected by the cylinder pressure sensor 29 to judge the actual combustion period of each injection and feedback controls the fuel injection timing and injection pressure so that the actual combustion period (start timing and length) becomes the optimum combustion period for the current engine operating conditions stored in the ROM. Due to this, the fuel injection timing and injection pressure of each cylinder are controlled to values giving the optimum combustion period simply and accurately.

Next, the control of the fuel injection amount in the present embodiment will be explained using FIG. 24(B).

The actual fuel injection amount of each cylinder corresponds to the amount of heat release in the cylinder from the compression stroke to the expansion stroke of the cylinder. This amount of heat release can be calculated by integrating the heat release rate calculated using the above equation, but as explained above, calculation using the heat release rate dQ is not practical.

Therefore, the actual amount of cylinder heat release is calculated using the product PV (hereinafter referred to as the "PV value") between the combustion chamber pressure P and the combustion chamber volume V at that time.

The energy of the gas in the combustion chamber is expressed by the product PV of the pressure and volume. Therefore, the energy given to the gas in the combustion chamber per unit crank angle is expressed as $d(PV)/d\theta$.

As explained above, the energy given to the gas in the combustion chamber per unit crank angle becomes the sum of the mechanical energy due to the compression of the piston and the chemical energy generated due to the combustion.

If converting the equation of state $PV=(m/W)RT$ of gas to a derivative form, the following is obtained:

$$d(PV)=(m/W)RdT \qquad (1)$$

where m is the mass (kg) of the gas in the combustion chamber, W is the molecular weight of the gas, T is the temperature (K), and R is a general gas constant (J/mol·K).

Further, equation (1) expresses the amount of change of the energy of a gas. This amount of change, as explained above, is expressed as the sum of the mechanical energy d(PV)pist due to compression of the piston and the chemical energy d(PV)chem generated due to combustion. That is, $$d(PV)=d(PV)pist+d(PV)chem \quad (2)$$

In the above equation (2), the energy d(PV)chem given to a gas by combustion is expressed as follows using the equation of state of gas of the above (1):

$$d(PV)chem=(m/W)RdTchem \quad (3)$$

where, dTchem is the rise in temperature of the gas due to combustion

If entering equation (3) into equation (2) to find dtchem, the result is $$dtchem=(W/m\cdot R)(d(PV)-d(PV)pist) \quad (4)$$

The amount of heat release dQ(J) due to combustion is found as the product of the temperature rise dTchem(K), the gas mass m (kg), and constant volume specific heat (J/mol·K) Cv, so from equation (4), $$\begin{aligned} dQ &= m\cdot Cv\cdot dTchem \\ &= Cv\cdot W\cdot R(d(PV)-d(PV)pist) \end{aligned} \quad (5)$$

The amount of heat release ΔQ for each injection can be found by integrating equation (5) from the combustion start (start) of each fuel injection to the combustion end (end) since the combustion period for each injection is known in FIG. 24(A).

That is, $$\begin{aligned} \Delta Q &= \frac{CV\times W}{R}\int_{start}^{end}(d(PV)-d(PV)_{pist})d\theta \\ &= \frac{CV\times W}{R}(((PV)_{end}-(PV)_{start})- \\ &\quad ((PV)_{pist,end}-(PV)_{pist,start})) \end{aligned} \quad (6)$$

where, (PV)end and (PV)start are the values at the time of combustion end and the time of combustion start of the product of the combustion chamber pressure P detected by the cylinder pressure sensors and the combustion chamber volume V.

Figure 24B:
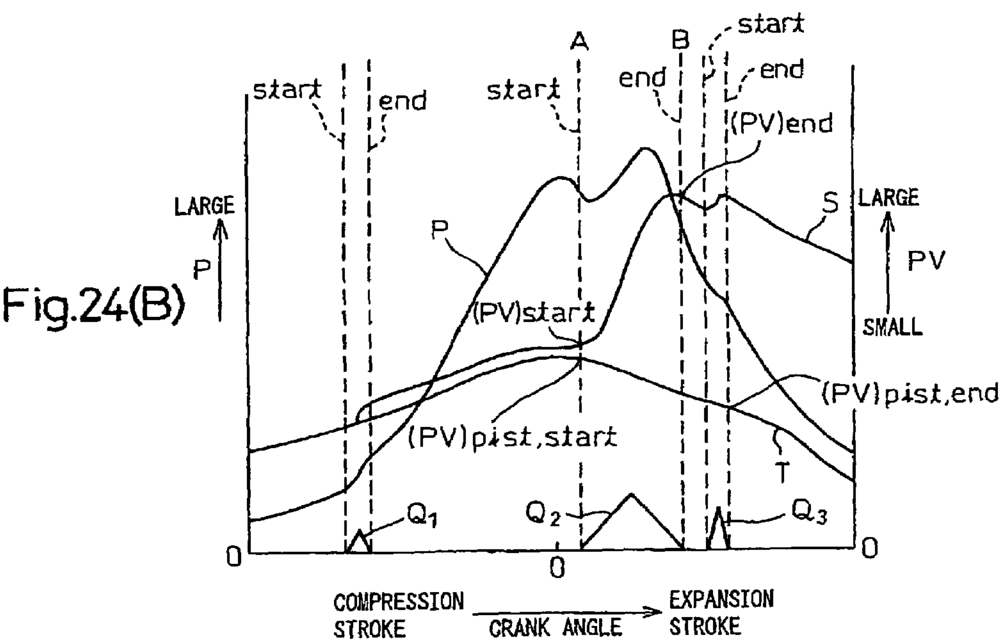
FIG. 24(B) is a view explaining the principle of detection of an amount of heat release.

Further, (PV)pist, end and (PV)pist, start are the values at the crank angles corresponding to the time of combustion end (FIG. 24(A), FIG. 24(B), end) and the time of combustion start (FIG. 24(A), FIG. 24(B), start) of the product of the combustion chamber pressure in the case of only piston compression in the case of no combustion occurring (so-called motoring) and the combustion chamber volume V.

FIG. 24(B) is a view showing the change of the PV value in the case of FIG. 24(A) and the change of the (PV)pist value. The curve P of FIG. 24(B) shows the change of pressure inside the combustion chamber the same as the curve P of FIG. 24(A), while the curve Q shows the heat release rate.

Further, curve S of FIG. 24(B) shows the PV value at the time of change of pressure of the curve P, while curve T shows the (PV)pist value. The (PV)pist value becomes a constant curve if the engine is determined.

Further, from the above equation (6), for example, the amount of heat release ΔQ of the main injection Q1 can be simply found using the PV value ((PV)start) and (PV)pist value ((PV)pist, start) at the point A and the PV value ((PV)end) and (PV)pist value ((PV)pist, end) at the point B.

The amount of heat release ΔQ has a strong correlation with the fuel injection amount. In the present embodiment, the ideal amount of heat release of each injection is found by experiments etc. in advance in accordance with the engine operating conditions and is stored in the ROM of the ECU 30. Therefore, by feedback correcting the fuel injection amount so that the actual amount of heat release found from equation (6) matches the ideal amount of heat release stored in the ROM, it becomes possible to control the fuel injection amount to the optimum value.

Figure 25:
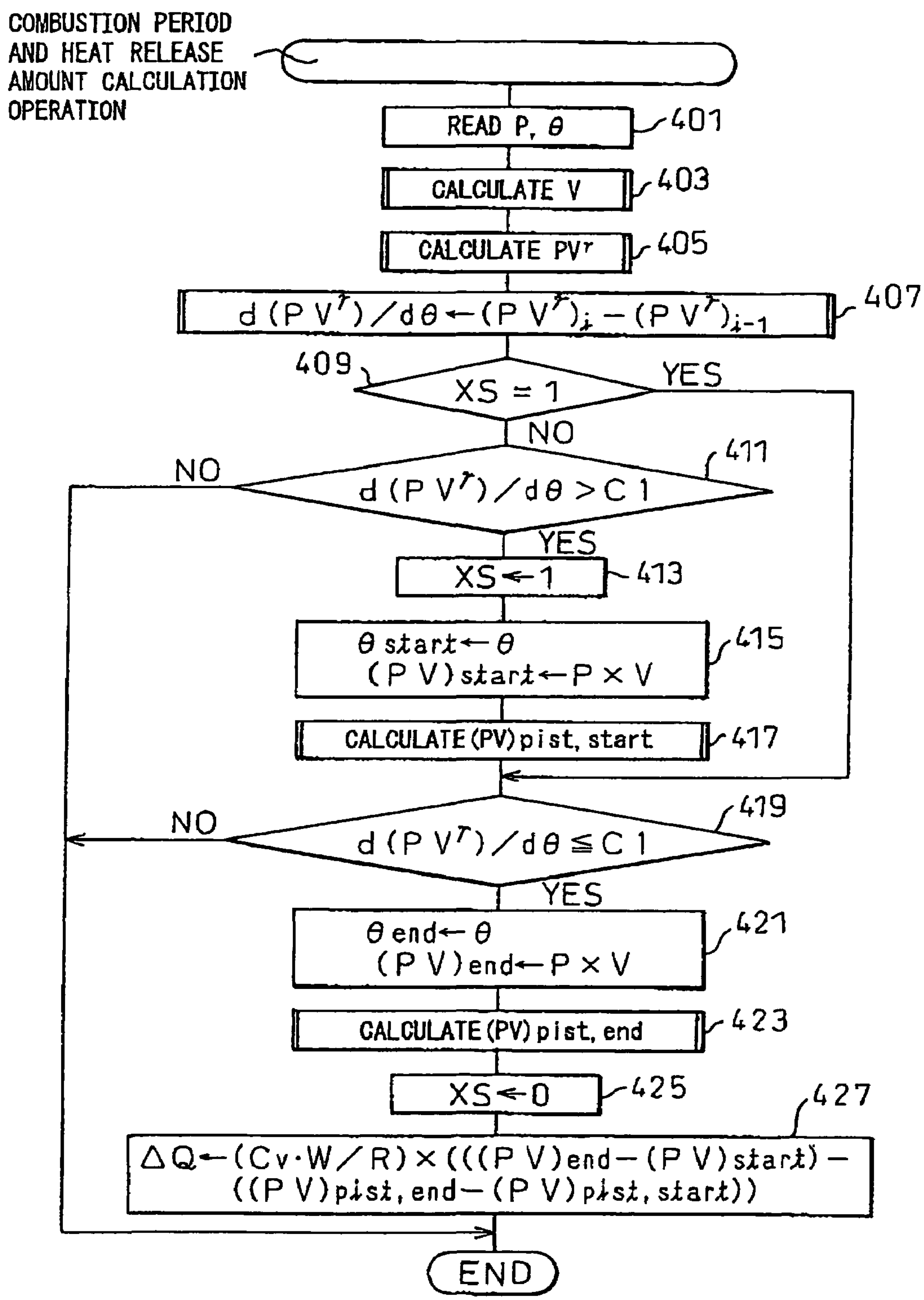
FIG. 25 is a flow chart explaining an operation for calculation of the combustion period and amount of heat release in the different fuel injections.

FIG. 25 is a flow chart showing the actual operation for calculation of the combustion period and amount of heat release explained above. This operation is executed every constant crank angle by the ECU 20.

In FIG. 25, at step 401, the current crank angle 0 and the combustion chamber pressure P detected by the cylinder pressure sensor 29 are read. Further, at step 403, the current combustion chamber volume V is calculated based on the crank angle θ. In the present embodiment, the relationship between θ and V is found by calculation in advance and is stored as a one-dimensional numerical value table in the ROM of the ECU 20. At step 403, the value of 0 read at step 401 is used to find the combustion chamber volume V from this numerical value table.

Next, at step 405, $PV^{\gamma}$ is calculated using the pressure P read at step 401 and the volume V calculated at step 403. γ (polytrope exponent) is found in advance by experiments and—is stored in the ROM of the ECU 20.

Step 407 shows the operation for calculation of the $PV^{\gamma}$ derivative. In the present embodiment, the $PV^{\gamma}$ derivative d$(PV^{\gamma})/d\theta$ is calculated as the difference between the currently calculated $PV^{\gamma}$ value $(PV^{\gamma})_i$ and the $(PV^{\gamma})_{i-1}$ calculated at the time of the previous execution of this operation.

Next, steps 409 to 417 show detection of the combustion start timing.

At step 409, it is judged if the value of the flag XS has been set to "1". The flag XS is a flag showing if the detection of the start timing of the combustion period has been completed. XS=1 shows completion of detection.

When detection has not been completed at step 409 (X≠1), the routine proceeds to step 411, where it stands by while holding off execution of the operation of step 413 on until the $PV^{\gamma}$ derivative calculated at step 407 becomes a predetermined value C1 or more. As explained above, the $PV^{\gamma}$ derivative becomes a value of about zero other than in the combustion period and becomes a positive value only during the combustion period. C1 is the judgment value for preventing erroneous detection due to noise etc. and is set to a positive value as close to zero as possible. When combustion is started, at step 411, the $PV^{\gamma}$ derivative becomes greater than C1, but when $d(PV^{\gamma})/d\theta>C1$ first stands at step 411, next at step 413, the value of the flag XS is set to "1", so from the next time on, steps 411 to 417 are not executed.

Due to this, the combustion start timing is accurately detected. That is, when $d(PV^{\gamma})/d\theta>C1$ first stands at step 411, at steps 415 and 417, the crank angle θ at that time is stored as the crank angle θstart of the start of combustion, and the PV value at that time is calculated and stored as the PV value (PV)start at the time of start of combustion. Further, at step 419, the PV value during motoring, that is, the value of (PV)pist at the time of combustion start, is found from the relationship of the curve T of FIG. 24(B) calculated in advance and is stored as (PV)pist, start.

Steps 419 to 425 show the operation for detection of the end timing of the combustion period. The operation for detecting the end timing is performed only when detection of the start timing of the combustion period of steps 411 to 417 is completed and XS is set to "1".

The operation of steps 419 to 425 is similar to the operation of steps 411 to 417, but differs in the point of storing the crank angle when $d(PV^{\gamma})/d\theta < C1$ at step 419 as the combustion end timing θend and the values of (PV) and (PV)pist at that time as (PV)end and (PV)pist, end. Further, after storing the above values, at step 425, the value of the flag XS is set to "0". Due to this, the steps from step 419 on are not executed again until the combustion start timing is detected from steps 411 to 417.

Further, after the end of the above operation, at step 427, the above equation (6) is used to calculate the amount of heat release ΔQ in the current combustion period.

As explained above, by executing the operation of FIG. 25, the combustion start timing θstart, combustion end timing θend, and amount of heat release ΔQ are calculated and stored for the plurality of fuel injections.

Next, the fuel injection control using the combustion start timing θstart, combustion end timing θend, and amount of heat release ΔQ calculated by the above will be explained.

In the present embodiment, the basic values of the fuel injection amount, injection timing, and fuel injection pressure and the type of the injection (type of multi-fuel injection) are set based on a predetermined relationship using the engine speed and accelerator opening degree by a not shown fuel injection setting operation separately executed by the ECU 20. Originally speaking, if actually injecting fuel as with these basic values, the combustion state of the engine becomes optimum. However, in practice, due to variation, changes, etc. in the injection characteristics of the fuel injectors, the actual fuel injection does not become like the basic values even if giving instruction signals corresponding to the basic values to the fuel injectors.

In the present embodiment, the combustion start timing θstart, combustion end timing θend, and amount of heat release ΔQ are used for feedback control of the fuel injection so that the actual fuel injection is performed by the basic values.

Figure 26:
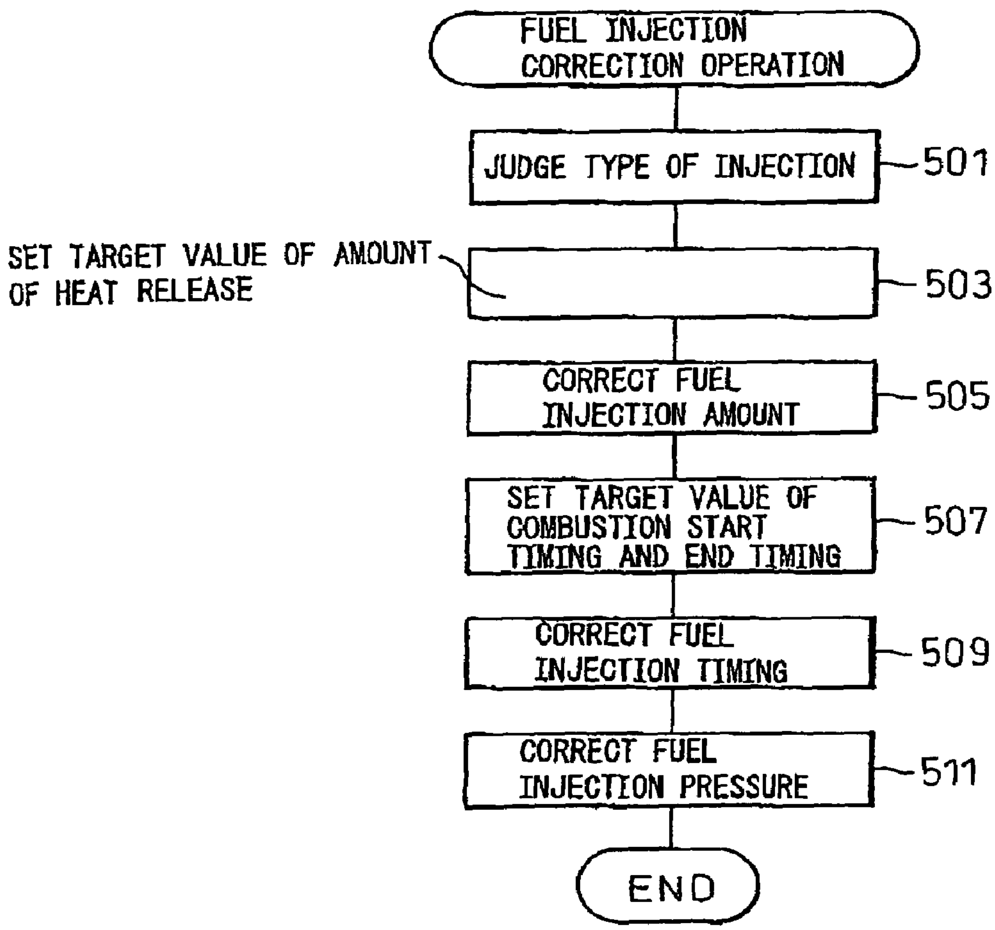
FIG. 26 is a flow chart explaining the routine of a fuel injection correction operation of the present embodiment.

FIG. 26 is a flow chart for explaining the routine of the fuel injection correction operation of the present embodiment performed by the ECU 20.

At step 501 of FIG. 26, first the fuel injection desired to be corrected is judged based on the engine operating conditions and the calculated θstart. That is, it is judged what fuel injection of what type of multi-fuel injection (for example, early pilot injection, close pilot injection, etc.) the fuel injection desired to be corrected is.

Further, at step 503, the target value of the amount of heat release of the fuel injection currently desired to be corrected is read from a numerical value table stored in advance in the ROM of the ECU 20 based on the engine operating conditions (engine speed and accelerator opening degree).

Further, at step 505, the fuel injection amount of corrected to increase or decrease so that the amount of heat release ΔQ calculated by the operation of FIG. 25 explained above matches with the target value selected at step 503. That is, when the actual amount of heat release ΔQ is smaller than the target value, the fuel injection amount is increased by a predetermined amount, while when it is larger than the target value, it is decreased by a predetermined amount.

Further, at step 507, the target values of the combustion start timing and end timing are similarly read from numerical value tables stored in advance in the ROM of the ECU 20 in advance based on the engine operating conditions. At step 509, the fuel injection timing is corrected so that the actual combustion start timing θstart matches the target value. For example, when the combustion start timing is delayed from the target value, the fuel injection start timing is advanced, while when it is advanced, it is delayed.

Further, at step 511, the fuel injection pressure is corrected. In the present embodiment, the common rail pressure is changed to adjust the fuel injection pressure. That is, at step 511, it is judged if the actual combustion end timing θend is delayed or advanced from the target value in the state with the combustion start timing θstart matched with the target value. When delayed (when actual combustion period is longer than target value), the fuel injection pressure is raised by exactly a predetermined amount to cause the end timing of the fuel injection (closing timing of fuel injector) to be advanced by exactly that amount and change the fuel injection period while maintaining the fuel injection amount constant. Further, conversely, when the actual combustion end timing is advanced from the target value, the fuel injection pressure is caused to drop by exactly a predetermined amount to cause the end timing of the fuel injection to be delayed.

By repeating these operations until the values match the target values, the actual fuel injection amount, fuel injection timing, and fuel injection pressure in the fuel injections of the multi-fuel injection are feedback corrected so as to become values giving the optimum combustion in accordance with the operating conditions. As explained above, the operation of FIG. 25 enables the combustion timing to be found using a derivative of $PV^{\gamma}$ able to be calculated by simple computation of the difference and the amount of heat release to be found by simple computation of the PV value. There is no longer a need for complicated calculation for detecting the amount of heat release or the combustion period. Therefore, the increase of the calculation load of the ECU 20 is prevented, the amount of heat release and combustion period of each injection can be accurately detected simply and reliably, and the injection amount, injection timing, and injection pressure of each injection can be accurately feedback controlled.

Further, in the present embodiment, since the injection amounts, injection timings, and injection pressures of the multi-fuel injection are feedback controlled based on the actual amount of heat release and combustion period, it becomes possible to accurately correct the fuel injection characteristics for example even when the variation between individual fuel injection characteristics due to tolerance of the fuel injectors is relatively large or when the fuel injection characteristics change along with use. Therefore, even in a common rail type fuel injection system, variation in characteristics of fuel injectors can be tolerated to a certain extent. There is no longer a need to strictly control variation in characteristics of the fuel injectors like in the past, so the cost of the fuel injectors can be reduced.

As explained above, according to the present invention, by using the optimum combustion parameter in accordance with the injection mode or combustion mode for feedback controlling the fuel injection amount, injection timing, and amount of EGR gas, it becomes possible to optimally control the combustion state of a diesel engine without greatly increasing the processing load of a control circuit.

What is claimed is:

1. A control system for an internal combustion engine provided with:

a fuel injector for injecting fuel into an engine combustion chamber, an EGR system for recirculating part of the engine exhaust into the engine combustion chamber as EGR gas, and a cylinder pressure sensor for detecting a pressure inside the engine combustion chamber, said control system for an internal combustion engine provided with:

combustion parameter calculating means for calculating a combustion parameter expressing an engine combustion state including at least one of a cylinder heat release amount, a combustion start timing, and a combustion period based on a relationship predetermined using the combustion chamber pressure detected by said cylinder pressure sensor and an engine crank angle and correcting means for correcting at least one of a fuel injection amount, fuel injection timing, and amount of EGR gas so that the calculated combustion parameter becomes a target value predetermined in accordance with the engine operating conditions and selecting as said combustion parameter a combustion parameter giving the smallest error in accordance with the fuel injection mode or combustion mode of the engine among a plurality of types of combustion parameters expressing said engine combustion state calculated based on the combustion chamber pressure and engine crank angle and using said selected combustion parameter for the correction by said correcting means.

2. A control system of an internal combustion engine as set forth in claim 1, wherein said fuel injection mode includes a fuel injection mode comprising main fuel injection and multi-fuel injection injecting fuel into the engine combustion chamber before or after or both before and after the main fuel injection combined in accordance with need.

3. A control system of an internal combustion engine as set forth in claim 2, wherein said injection correcting means first corrects an overall fuel injection amount to the combustion chamber and main fuel injection timing and then, when performing multi-fuel injection, corrects the fuel injection amount or fuel injection timing of said multi-fuel injection in the state where the main fuel injection has been corrected.

4. A control system of an internal combustion engine as set forth in claim 2, further provided with sensor calibrating means for correcting error of said cylinder pressure sensor output based on actual combustion chamber pressure detected by said cylinder pressure sensor at a predetermined crank angle.

5. A control system of an internal combustion engine as set forth in claim 2, wherein said engine operating conditions is defined by an engine speed and accelerator opening degree.

6. A control system of an internal combustion engine as set forth in claim 5, wherein said selected combustion parameters are a maximum value of combustion chamber pressure after the start of combustion and a crank angle where the combustion chamber pressure becomes the maximum.

7. A control system of an internal combustion engine as set forth in claim 5, wherein said selected combustion parameter is a crank angle where a rate of change of combustion chamber pressure becomes maximal.

8. A control system of an internal combustion engine as set forth in claim 5, wherein said selected combustion parameter is a crank angle where a second derivative of combustion chamber pressure becomes maximal.

9. A control system of an internal combustion engine as set forth in claim 5, wherein said selected combustion parameters are a maximum value of a product of the combustion chamber pressure and combustion chamber actual volume and a crank angle where the product of the combustion chamber pressure and combustion chamber actual volume becomes maximum.

10. A control system of an internal combustion engine as set forth in claim 5, wherein said selected combustion parameter is a difference ΔPVmax between a maximum value of a product of the combustion chamber pressure and combustion chamber actual volume and a product of the combustion chamber pressure due to only compression in the case of assuming no combustion occurred and combustion chamber actual volume at a crank angle where the product of the combustion chamber pressure and combustion chamber actual volume becomes maximum.

11. A control system of an internal combustion engine as set forth in claim 5, wherein said selected combustion parameter is a crank angle where a cylinder heat release rate becomes maximum.

12. A control system of an internal combustion engine as set forth in claim 5, wherein said selected combustion parameter is an overall amount of cylinder heat release.

13. A control system of an internal combustion engine as set forth in claim 5, wherein said selected combustion parameter is a difference between a maximum value of cylinder pressure after the start of combustion and a cylinder minimum pressure in the interval after compression top dead center to when combustion is started in the combustion chamber.

14. A control system of an internal combustion engine as set forth in claim 5, wherein said selected combustion parameter is a difference between a maximum value of cylinder pressure after the start of combustion and a combustion chamber pressure due only to compression in the case assuming no combustion occurred at the crank angle where said cylinder pressure becomes maximum.

15. A control system of an internal combustion engine as set forth in claim 5, wherein said multi-fuel injection includes pilot fuel injection performed before main fuel injection, and said correcting means uses as a combustion parameter the difference between a product of a combustion chamber pressure and combustion chamber actual volume when fuel injected by main fuel injection is ignited and a product of a combustion chamber pressure due to only compression in the case assuming no combustion occurred and the combustion chamber actual volume at a crank angle where fuel injected by the main fuel injection is ignited so as to correct a pilot fuel injection instruction.

16. A control system of an internal combustion engine as set forth in claim 5, wherein said multi-fuel injection includes after injection performed after main fuel injection, and said correcting means uses as a combustion parameter the difference (ΔPVmax−ΔPVafter) between a difference ΔPVmax between a maximum value of a product of a combustion chamber pressure and combustion chamber actual volume and a product of a combustion chamber pressure when fuel injected by after injection is ignited and a combustion chamber actual volume and a difference ΔPVafter between a product of a combustion chamber pressure when fuel injected by after injection is ignited and the combustion chamber actual volume and the product of a combustion chamber pressure due to only compression in the case assuming no combustion occurred and the combustion chamber actual volume at a crank angle where fuel injected by the after injection is ignited so as to correct an after injection instruction.

17. A control system of an internal combustion engine as set forth in claim 6, wherein said correcting means performs said correction using as said combustion parameters a maximum value of a combustion chamber pressure after the start of combustion and a crank angle where the combustion chamber pressure becomes maximum only for the main fuel injection.

18. A control system of an internal combustion engine as set forth in claim 5, wherein said system is further provided with a throttle valve for throttling the engine intake air amount and wherein said injection correcting means corrects the main fuel injection, then uses as combustion parameters the difference between the combustion chamber pressure due to compression at compression top dead center and the cylinder minimum pressure in the interval from compression top dead center to when combustion is started in the combustion chamber and the combustion chamber pressure maximum value after the start of combustion so as to correct said throttle valve opening degree and main fuel injection timing so that the values of these two combustion parameters match their target values.

19. A control system of an internal combustion engine as set forth in claim 18, wherein said engine can operate switching between a normal combustion mode of injecting fuel after the compression stroke and performing combustion by a large rate of excess air and a low temperature combustion mode of advancing the fuel injection timing from the normal combustion mode and increasing the amount of EGR gas and wherein said injection correcting means corrects said throttle valve opening degree and main fuel injection timing so that the values of said two combustion parameters match their target values when switching modes between said normal combustion mode and low temperature combustion mode.

20. A control system of an internal combustion engine as set forth in claim 1, wherein said combustion mode of said engine includes modes of different amounts of supply of EGR gas to the combustion chamber.

21. A control system of an internal combustion engine as set forth in claim 20, wherein said selected combustion parameter is a time $\Delta t$, calculated based on a value of a product PV of a combustion chamber pressure P detected by a cylinder pressure sensor and a combustion chamber volume V determined from the crank angle $\theta$, from the start of fuel injection from the fuel injector to when the value of said PV becomes the maximum value PVmax and wherein said correcting means adjusts the amount of said EGR gas so that said time $\Delta t$ becomes a predetermined target value.

22. A control system of an internal combustion engine as set forth in claim 21, wherein further said combustion parameter calculating means further calculates a product PVbase between a combustion chamber pressure occurring due to only compression of the piston in the case of assuming that combustion did not occur in the combustion chamber and a combustion chamber volume determined from the crank angle and uses a value of PVbase at the crank angle $\theta$pvmax where said PV becomes the maximum value PVmax to calculate a difference $\Delta$PVmax between PVmax and PVbase and wherein said correcting means further controls the fuel injection amount and fuel injection timing from said fuel injector so that the values of $\Delta$PVmax and said $\theta$pvmax become their predetermined target values.

23. A control system of an internal combustion engine as set forth in claim 21, wherein said target value is determined in accordance with an engine speed and accelerator opening degree.

24. A control system of an internal combustion engine as set forth in claim 23, wherein said internal combustion engine is a compression ignition engine.

25. A control system of an internal combustion engine as set forth in claim 24, wherein said engine can operate switching between two modes of a normal combustion mode of injecting fuel after the compression stroke and performing combustion by a large rate of excess air and a low temperature combustion mode of advancing the fuel, injection timing from the normal combustion mode and increasing the amount of EGR gas and controls the amount of EGR gas based on the value of said $\Delta t$ when operating in said low temperature mode of the engine.

26. A control system of an internal combustion engine as set forth in claim 25, wherein said correcting means further makes the fuel injection timing continuously change from the injection timing at the normal combustion mode to the target fuel injection timing at the low temperature combustion mode over a predetermined transition time when switching from said normal combustion mode to low temperature combustion mode and controls the amount of EGR gas based on the value of the $\Delta t$ calculated using the target fuel injection timing at the low temperature combustion mode after switching instead of the actual fuel injection timing during said transition time.

27. A control system of an internal combustion engine as set forth in claim 20, wherein said selected combustion parameter is a time $\Delta$td, determined based on a value of $PV^K$ calculated from a combustion chamber pressure P detected by said cylinder pressure sensor, a combustion chamber volume V determined from a crank angle $\theta$, and a specific heat ratio $\kappa$ of the combustion gas, from the start of fuel injection from a fuel injector to when the value of said $PV^K$ becomes the minimum value $PV^K$min and wherein said correcting means controls the amount of EGR gas so that said $\Delta$td becomes a predetermined target value.

28. A control system of an internal combustion engine as set forth in claim 20, wherein said selected combustion parameter is a time $\Delta$tc, determined based on a value of $PV^K$ calculated from a combustion chamber pressure P detected by said cylinder pressure sensor, a combustion chamber volume V determined from a crank angle $\theta$, and a specific heat ratio $\kappa$ of the combustion gas, from when the value of said $PV^K$ becomes the minimum value $PV^K$min after the start of fuel injection from a fuel injector to when it becomes the maximum value $PV^K$max and wherein said correcting means adjusts the amount of EGR gas so that said $\Delta$to becomes a predetermined target value.

29. A control system of an internal combustion engine as set forth in claim 27, wherein said fuel injector performs pilot injection for injecting a small amount of fuel into the combustion chamber before main fuel injection and wherein said combustion parameter calculating means starts detecting the value of said $PV^K$ min after the start of main fuel injection.

30. A control system of an internal combustion engine as set forth in claim 1, wherein said selected combustion parameter is a rate of change d $(PV^\gamma)/d\theta$ of the parameter $PV^\gamma$ with respect to the crank angle $\theta$ calculated as a product of a $\gamma$ power of V and P using a combustion chamber pressure P detected by said cylinder pressure sensor, a combustion chamber volume V determined from the crank angle $\theta$, and a predetermined constant $\gamma$ and wherein said correcting means detects a combustion period including a combustion start timing and end timing in the combustion chamber based on said rate of change and corrects at least one of the fuel injection timing and fuel injection pressure from said fuel injector so that said combustion period matches a predetermined duration.

31. A control system of an internal combustion engine as set forth in claim 30, wherein further said correcting means calculates an amount of cylinder heat release in said combustion period based on the value of a parameter PV calculated as a product of said combustion chamber pressure P and said combustion chamber volume V at said combustion start timing and said combustion end timing and corrects the fuel injection amount from said fuel injector so that the calculated amount of cylinder heat release becomes a predetermined value.

32. A control system of an internal combustion engine as set forth in claim 31, wherein said engine performs, in addition to main fuel injection, multi-fuel injection for injecting fuel into the engine combustion chamber before or after or both before and after the main fuel injection and wherein said correcting means corrects the fuel injection timing or fuel injection pressure based on the value of said $d(PV^{\gamma})/d\theta$ for at least one fuel injection in the multi-fuel injection and corrects the fuel injection amount based on the value of said PV.

* * * * *